United States Patent [19]
Takamatsu et al.

[11] Patent Number: 5,586,103
[45] Date of Patent: *Dec. 17, 1996

[54] DISC PLAYER WITH AN AUTOMATIC DISC CHARGER INCLUDING EJECT LOCKING MECHANISM AND MOVABLE CHASSIS HOLDING MECHANISM

[75] Inventors: Ryoji Takamatsu; Tomohiro Watanabe, both of Kanagawa, Japan

[73] Assignee: Sony Corporation, Tokyo, Japan

[*] Notice: The term of this patent shall not extend beyond the expiration date of Pat. No. 5,063,557.

[21] Appl. No.: 503,470

[22] Filed: Jul. 18, 1995

Related U.S. Application Data

[63] Continuation of Ser. No. 208,796, Mar. 9, 1994, abandoned, which is a continuation of Ser. No. 856,721, Mar. 24, 1992, abandoned.

[30] Foreign Application Priority Data

Mar. 29, 1991 [JP] Japan .................... 3-093416

[51] Int. Cl.[6] .................................. G11B 17/30
[52] U.S. Cl. .............................. 364/244; 369/36
[58] Field of Search ................... 369/36, 263, 38, 369/75.2, 178, 191, 192, 247, 258, 270, 219, 244, 246; 360/99.06, 99.02

[56] References Cited

U.S. PATENT DOCUMENTS

| | | | |
|---|---|---|---|
| 4,589,101 | 5/1986 | Schatteman et al. | 369/38 |
| 4,797,865 | 1/1989 | Imai et al. | 369/36 |
| 4,811,151 | 3/1989 | Kanazawa et al. | 360/99.06 |
| 4,841,499 | 6/1989 | Takahashi et al. | 369/38 |
| 5,034,937 | 7/1991 | Caspers et al. | 369/36 |
| 5,042,024 | 8/1991 | Kurosawa et al. | 369/263 |
| 5,062,099 | 10/1991 | Odawara et al. | 369/263 |
| 5,063,557 | 11/1991 | Takamatsu et al. | 364/244 |
| 5,103,437 | 4/1992 | Kawakami | 369/36 |
| 5,123,001 | 6/1992 | Nakamichi et al. | 369/36 |
| 5,142,522 | 8/1992 | Muramatsu et al. | 369/75.2 |

FOREIGN PATENT DOCUMENTS

| | | |
|---|---|---|
| 0217393 | 4/1987 | European Pat. Off. . |
| 267547 | 5/1988 | European Pat. Off. . |
| 305035 | 3/1989 | European Pat. Off. . |
| 329230 | 8/1989 | European Pat. Off. . |
| 358243 | 3/1990 | European Pat. Off. . |
| 2531799 | 2/1984 | France . |
| 2159659 | 12/1985 | United Kingdom . |
| 2160349 | 12/1985 | United Kingdom . |

OTHER PUBLICATIONS

PCT Application WO89/05508 (Miyoshi et al.).
Communication (European Search Report–Jan. 12, 1995).

*Primary Examiner*—Robert S. Tupper
*Assistant Examiner*—Kevin M. Watkins
*Attorney, Agent, or Firm*—Jay H. Maioli

[57] ABSTRACT

A disc player having a chassis supported in an outer housing through resilient members and having a cartridge housing unit therein which stores a disc cartridge housing a stack of discs. The disc player also has a locking and ejecting mechanism in the chassis for selectively locking and ejecting the disc cartridge. A disc playback unit and a disc withdrawing mechanism are mounted on a movable chassis that is movably mounted in the chassis for movement along the stack of discs.

8 Claims, 17 Drawing Sheets ns, detecting means for detecting whether a tray or a disc
DISC PLAYER WITH AN AUTOMATIC DISC CHARGER INCLUDING EJECT LOCKING MECHANISM AND MOVABLE CHASSIS HOLDING MECHANISM This is a continuation of application Ser. No. 08/208,796 filed Mar. 9, 1994 (now abandoned) which in turn is a continuation of 07/856,721 filed on Mar. 24, 1992 (now abandoned).

BACKGROUND OF THE INVENTION

1. Field of the Invention

The present invention relates to a disc player with an automatic disc changer for playing back a plurality of stored discs interchangeably.

2. Description of the Prior Art

Some disc players for reproducing recorded information signals from optical discs such as digital audio discs are combined with an automatic disc changer. The automatic disc changer includes a detachable disc cartridge housing a vertical stack of disc trays with respective discs placed thereon. A selected disc is fed from the disc cartridge to a disc playback unit of the disc player. Known disc players with automatic disc changers are disclosed in U.S. Pat. No. 4,614,474 and Japanese laid-open patent publication No. 62-14372, for example.

The automatic disc changer shown in Japanese laid-open patent publication No. 62-14372 includes a cartridge housing unit for housing the disc cartridge. Between the cartridge housing unit and the disc playback unit, there is disposed a linearly movable tray withdrawing mechanism for withdrawing a desired one of the disc trays with a disc carried thereon out of the disc cartridge toward the disc playback unit. When the disc tray is positioned out of the disc cartridge, the disc placed on the disc tray is lifted into the disc playback unit. Then, the information signal recorded on the disc is read or reproduced by a signal reading device in the disc playback unit.

The disc cartridge has a casing having surrounding walls with an opening defined in the front wall. The disc trays are stacked in the casing. When one of the stored discs is to be played back, the disc tray carrying the disc is pulled fully out of the casing, and then the disc is chucked and inserted into the disc playback unit.

The number of discs that can be stored in the disc cartridge is limited by the size of the disc cartridge. If the user wishes to play back optical discs other than those stored in the disc cartridge, then the user must replace the loaded disc cartridge with another disc cartridge containing those discs desired to be played back. Frequent replacement of disc cartridges makes the disc player inconvenient to use.

Sometimes, the user attempts to eject the loaded disc cartridge out of the cartridge housing unit for replacement with another disc cartridge while a disc tray from the loaded disc cartridge is being withdrawn toward the disc playback unit. Such an attempt may tend to damage the disc, the disc tray, the disc cartridge, and also the disc playback unit.

Disc players with automatic disc changers find wide use on automobiles or the like. For use on automobiles, however, the internal mechanism of the disc player, including the cartridge housing unit and the disc playback unit, needs to be floatingly supported in the overall housing of the disc player for protection against automobile vibrations which would otherwise adversely affect the playback operation of the disc player. However, since the floating internal mechanism is movable in the disc player housing, the disc cartridge may not stably and reliably be loaded into and unloaded out of the cartridge housing unit.

For playback of a disc, the disc playback unit of certain disc players with automatic disc changers moves toward the disc cartridge, and the disc is withdrawn out of the disc cartridge and fed toward the disc playback unit. Since, therefore, the disc player has many motors for moving and feeding such player components and discs, the disc player is relatively complex and heavy.

Another problem of the conventional disc players with automatic disc changers is that a large space is required in which the tray withdrawing mechanism operates to withdraw a desired disc tray fully out of the disc cartridge for playback. As a consequence, the disc player is relatively large in the direction in which the disc trays are withdrawn from the disc cartridge, e.g., the disc player has a relatively large depth, with a resultant large disc player size.

OBJECTS AND SUMMARY OF THE INVENTION

It is an object of the present invention to provide a disc player having an automatic disc changer which detects when a disc tray is withdrawn from a disc cartridge at the time the disc cartridge is to be ejected out of a cartridge housing unit, actuates a tray withdrawing mechanism to return the withdrawn disc tray back into the disc cartridge, and thereafter ejects the disc cartridge out of the cartridge housing unit.

Another object of the present invention is to provide a disc player having an automatic disc changer which has a chassis supporting various mechanisms and units, the chassis being mounted in an outer housing in different manners such that when a disc cartridge is to be loaded or unloaded, the chassis is fixed to the outer housing to allow the disc cartridge to be loaded or unloaded smoothly, and when a disc is played back, the chassis is floatingly mounted in the outer housing to protect the disc from undesirable vibrations.

Still another object of the present invention is to provide a disc player having an automatic disc changer which includes a chassis supporting a cartridge housing unit, and a movable chassis supporting a disc playback unit, a mechanism for transmitting drive power between the chassis, with one of the chassis supporting a drive source that is shared by the chassis through the drive power transmitting mechanism.

Yet still another object of the present invention is to provide a disc player having an automatic disc changer which allows a desired disc to be played back without being fully withdrawn from a disc cartridge.

According to the present invention, there is provided a disc player comprising a disc cartridge housing a stack of trays which carry discs respectively thereon, the trays being selectively withdrawable from the disc cartridge, a cartridge housing unit, the disc cartridge being removably loaded in the cartridge housing unit, withdrawing means for withdrawing a selected one of the trays which carries a corresponding disc thereon from the disc cartridge, disc playback means for playing back the disc carried on the tray which has been withdrawn from the disc cartridge by the withdrawing means, detecting means for detecting whether a tray or a disc carried thereon is withdrawn from the disc cartridge, and locking and ejecting means for selectively locking the disc cartridge in the cartridge housing unit and ejecting the disc cartridge from the cartridge housing unit, the locking and ejecting means comprising means for allowing the disc cartridge to be ejected from the cartridge housing unit after the withdrawn tray with the disc carried thereon is returned into the disc cartridge by the withdrawing means when the tray or the disc has been detected as being withdrawn from the disc cartridge by the detecting means.

According to the present invention, there is also provided a disc player comprising a disc cartridge housing a stack of trays which carry discs respectively thereon, the trays being selectively withdrawable from the disc cartridge, an outer housing having an insertion slot for inserting therethrough the disc cartridge, disc playback means for playing back a disc carried on a tray which has been withdrawn from the disc cartridge, a chassis disposed in the outer housing in spaced-apart relationship to inner surfaces of the outer housing, the disc playback means being mounted in the chassis, and holding means, between the chassis and the inner surfaces of the outer housing, for holding the chassis fixedly with respect to the outer housing to keep the chassis spaced from the inner surfaces of the outer housing when the disc cartridge is loaded and unloaded through the insertion slot.

According to the present invention, there is further provided a disc player comprising a chassis having a disc storage region storing a stack of discs therein, disc playback means for playing back the discs fed from the disc storage region, a movable chassis disposed in the chassis for movement along the array of discs, the disc playback means being supported on the movable chassis, a drive source mounted on either the chassis or the movable chassis, and a driven mechanism mounted on the other chassis, and transmitting means, between the chassis and the movable chassis, for transmitting a drive force from the drive source to the driven mechanism irrespective of movement of the movable chassis.

According to the present invention, there is also provided a disc player comprising a disc cartridge housing a stack of at least six discs, the discs being selectively withdrawable from the disc cartridge, a chassis having a cartridge housing unit, the disc cartridge being removably loaded in the cartridge housing unit, disc playback means for playing back a selected one of the discs which has been withdrawn from the disc cartridge, a movable chassis disposed in the chassis for movement along the array of discs, the disc playback means being supported on the movable chassis, an outer housing, the disc cartridge, the chassis, the disc playback means, and the movable chassis being disposed in the housing, and holding means, in the outer housing, for holding the chassis in the outer housing, the outer housing being in the form of a rectangular parallelepiped having a depth ranging from 215 to 230 mm, a width ranging from 70 to 95 mm, and a height ranging from 150 to 160 mm.

The disc cartridge for use in the disc player comprises a casing housing a stack of discs in spaced-apart relationship to each other, the casing having a front opening for allowing the discs to be withdrawn from the casing and returned into the casing therethrough, the casing having a cavity defined therein and extending from the front opening into a side plate thereof confronting the stack of discs, a lid movably mounted on the casing for selectively opening and closing the cavity, and means for withdrawing and returning a selected one of the discs from and into the casing through the opening.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

The principles of the present invention are particularly useful when embodied in a disc player with an automatic disc changer.

Figure 1:
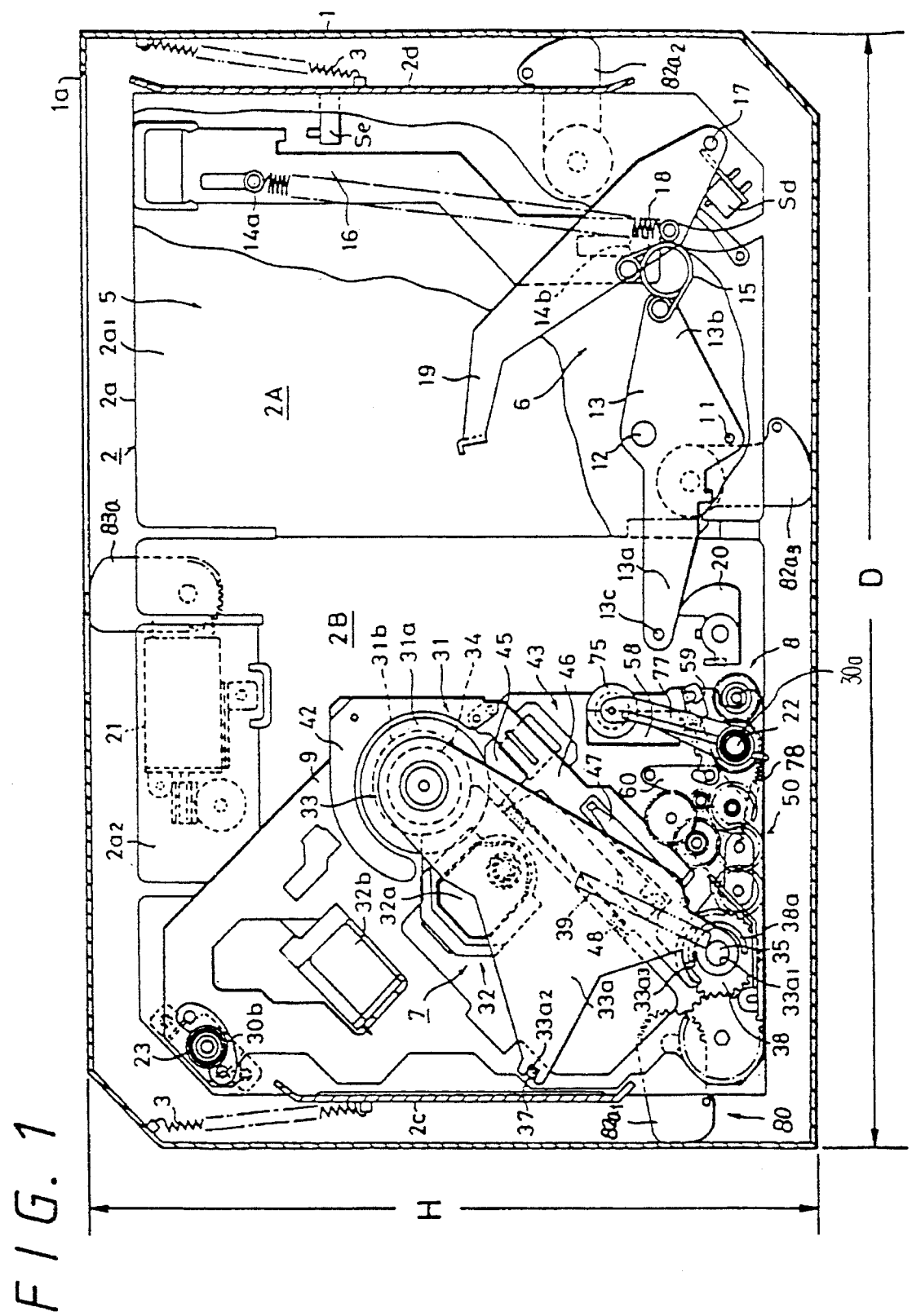
FIG. 1 is a side elevational view of a disc player with an automatic disc changer.
Figure 2:
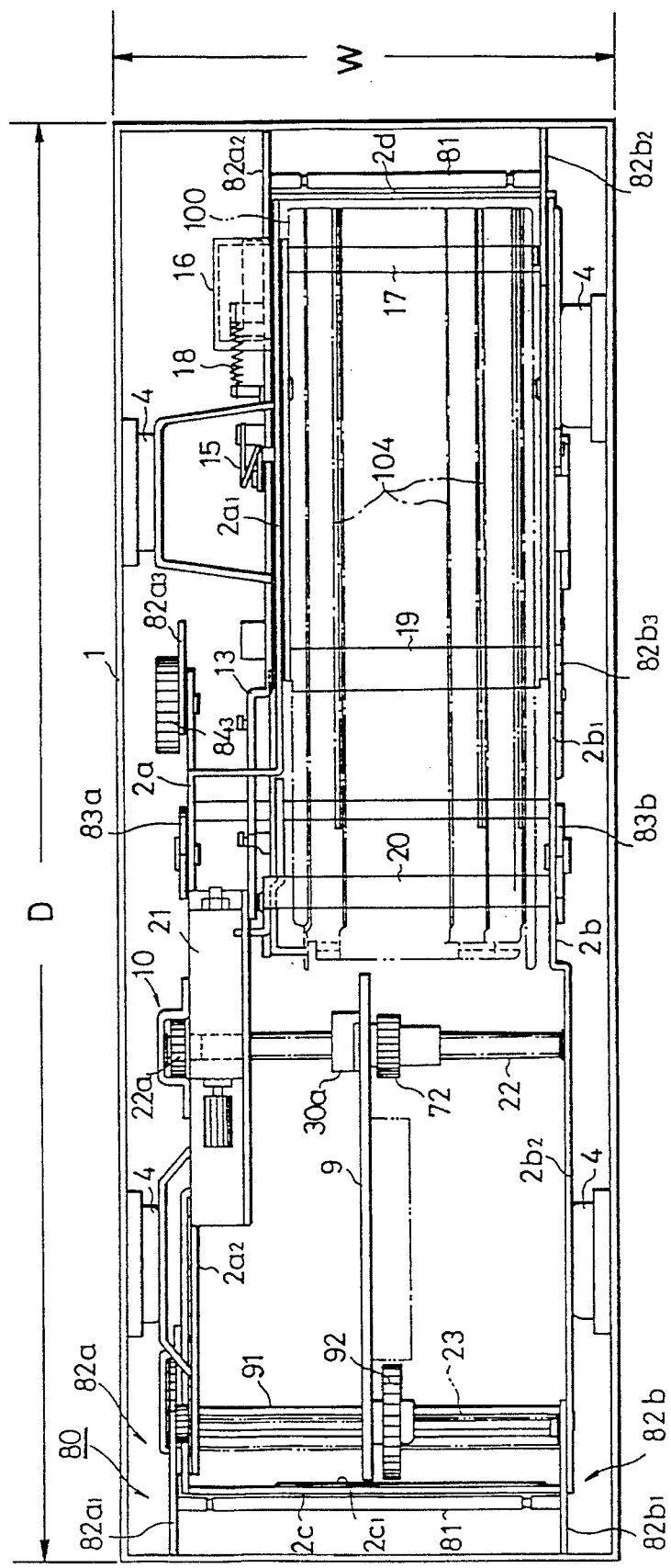
FIG. 2 is a plan view, partly omitted from illustration, of the disc player.

FIGS. 1 and 2 show a disc player with an automatic disc changer according to the present invention.

As shown in FIGS. 1 and 2, the disc player has an outer housing 1 in the form of a relatively small rectangular parallelepiped having a depth D ranging from 215 to 230 mm, a width W ranging from 70 to 95 mm, and a height H ranging from 150 to 160 mm. The outer housing 1 has an insertion slot 1a defined in a half portion of an upper wall thereof for the insertion therethrough of a disc cartridge which stores a plurality of (at least six) discs vertically stacked therein. A mechanical chassis 2 for supporting various mechanisms and units is resiliently supported floatingly in the outer housing 1 in spaced-apart relationship to inner surfaces thereof by resilient suspension members 3 such as coil springs or the like and support dampers 4 such as of rubber.

The mechanical chassis 2 comprises a pair of spaced side plates 2a, 2b and a pair of spaced front and rear plates 2c, 2d which jointly form a quadrilateral shape. The mechanical chassis 2 has a half region 2A serving as a cartridge housing unit 5 which accommodates a disc cartridge below the insertion slot 1a. The cartridge housing unit 5 includes a locking and ejecting mechanism 6 for locking and ejecting a disc cartridge. The mechanical chassis 2 houses, in another half region 2B thereof, a movable chassis 9 which supports a disc playback unit 7 and a disc feed mechanism 8. The movable chassis 9 is movable with respect to the cartridge housing unit 5 by a chassis moving mechanism 10 in the direction in which the discs are stacked, i.e., in the transverse direction of the disc player.

The locking and ejecting mechanism 6 has a lock lever 13 with a projecting lock pin 11 for engaging the disc cartridge. The lock lever 13 is rotatably mounted at a central portion thereof, by a pin 12, on an outer surface of the cartridge housing unit 5, i.e., an outer surface of a side plate portion $2a_1$ of the side plate 2a in the half region 2A. The lock lever 13 has a front end portion 13a extending into the other half region 2B of the mechanical chassis 2. The locking and ejecting mechanism 6 also has an unlock lever 16 disposed in the same plane as the lock lever 13 and slidably guided by a pair of guide pins 14a, 14b. The unlock lever 16 is operatively coupled to a rear end portion 13b of the lock lever 13 by a torsion spring 15. The locking and ejecting mechanism 6 has an eject lever 19 disposed in the cartridge housing unit 5 and has an end pivotally supported by a shaft 17 between the side plate portion $2a_1$ and a side plate portion $2b_1$ of the side plate 2b in the half region 2A. The eject lever 19 is normally urged in a direction to push the disc cartridge outward by a tension spring 18. The locking and ejecting mechanism 6 further includes an eject prevention plate 20 pivotally supported between the side plates 2a, 2b near a side edge of the front end portion 13a of the lock lever 13. When a disc tray is withdrawn out of the disc cartridge, the eject prevention plate 20 is turned into abutment against an engagement pin 13c projecting on the tip end of the front end portion 13a for preventing the lock lever 13 from being turned thereby to prevent the disc cartridge from being ejected. The cartridge housing unit 5 has an eject switch Se actuatable by the unlock lever 16 and a disc detecting switch Sd for detecting discs D in the disc cartridge.

The chassis moving mechanism 10 comprises a motor 21 mounted on a side plate portion $2a_2$ of the side plate 2a in the half region 2B, two feed screws 22, 23 threaded through the movable chassis 9 at diagonally spaced corners thereof and extending between the side plate portion $2a_2$ and a side plate portion $2b_2$ of the side plate 2a in the half region 2B, and a gear train 24 (see FIG. 3) for transmitting the rotation of the motor 21 to the feed screws 22, 23.

Figure 3:
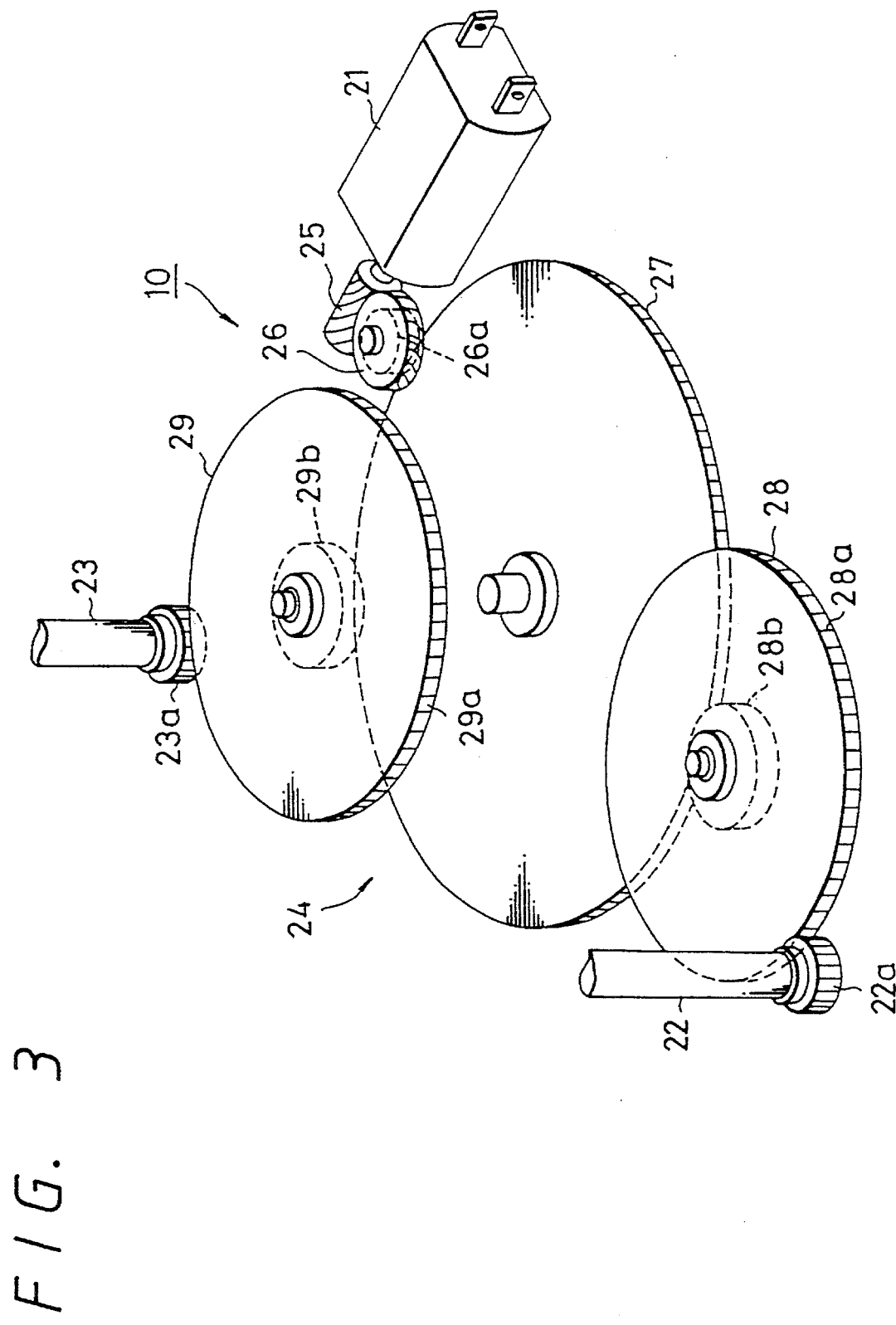
FIG. 3 is a fragmentary perspective view of a chassis moving mechanism.
Figure 9:
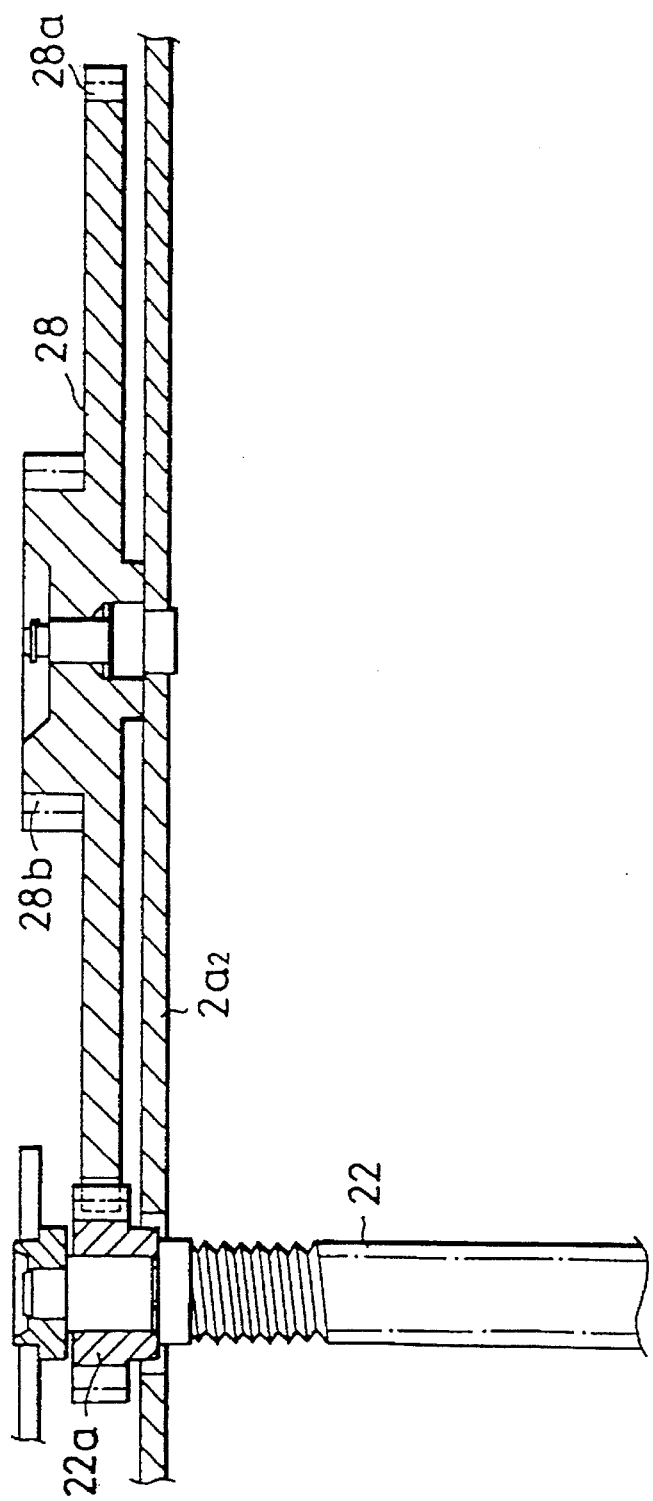
FIG. 9 is a fragmentary cross-sectional view of a portion of the chassis moving mechanism.

As shown in FIG. 3, a worm 25 is mounted on the shaft of the motor 21. Drive gears 22a, 23a are mounted respectively on the ends of the feed screws 22, 23 on the side plate portion $2a_2$. The gear train 24 comprises a worm wheel 26 held in mesh with the worm 25, a large-diameter central gear 27 held in mesh with a small-diameter gear 26a of the worm wheel 26, and two transmission gears 28, 29 positioned between the central gear 27 and the drive gears 22a, 23a and having large-diameter toothed portions 28a, 29a meshing with the drive gears 22a, 23a, respectively, and small-diameter toothed portions 28b, 29b meshing with the central gear 27 (see also FIG. 9). The worm wheel 26, the central gear 27, and the transmission gears 28, 29 are rotatably supported on the side plate portion $2a_2$ for transmitting the rotation of the motor 21 to the feed screws 22, 23 to rotate the feed screws 22, 23 in synchronism with each other.

The feed screws 22, 23 are threaded through respective internally threaded members 30a, 30b fixed to the movable chassis 9. When the feed screws 22, 23 are synchronously rotated by the motor 21, the movable chassis 9 moves parallel to the cartridge housing unit 5. The internally threaded member 30b is of a semicylindrical shape with its teeth formed on the arcuate edge in mesh with the feed screw 23 that extends through the movable chassis 9.

The disc playback unit 7 mounted on the movable chassis 9 comprises a disc rotating mechanism 31 for supporting and rotating a disc D, an optical reading mechanism 32, and a chuck mechanism 33 for chucking a disc D against a turntable 31a of the disc rotating mechanism 31.

The disc rotating mechanism 31 has a spindle motor 31b for rotating the turntable 31a about its own axis. The optical reading mechanism 32 comprises an optical pickup 32a, a pickup moving mechanism including a motor 32b, and a control circuit board for controlling the pickup moving mechanism.

Figure 4:
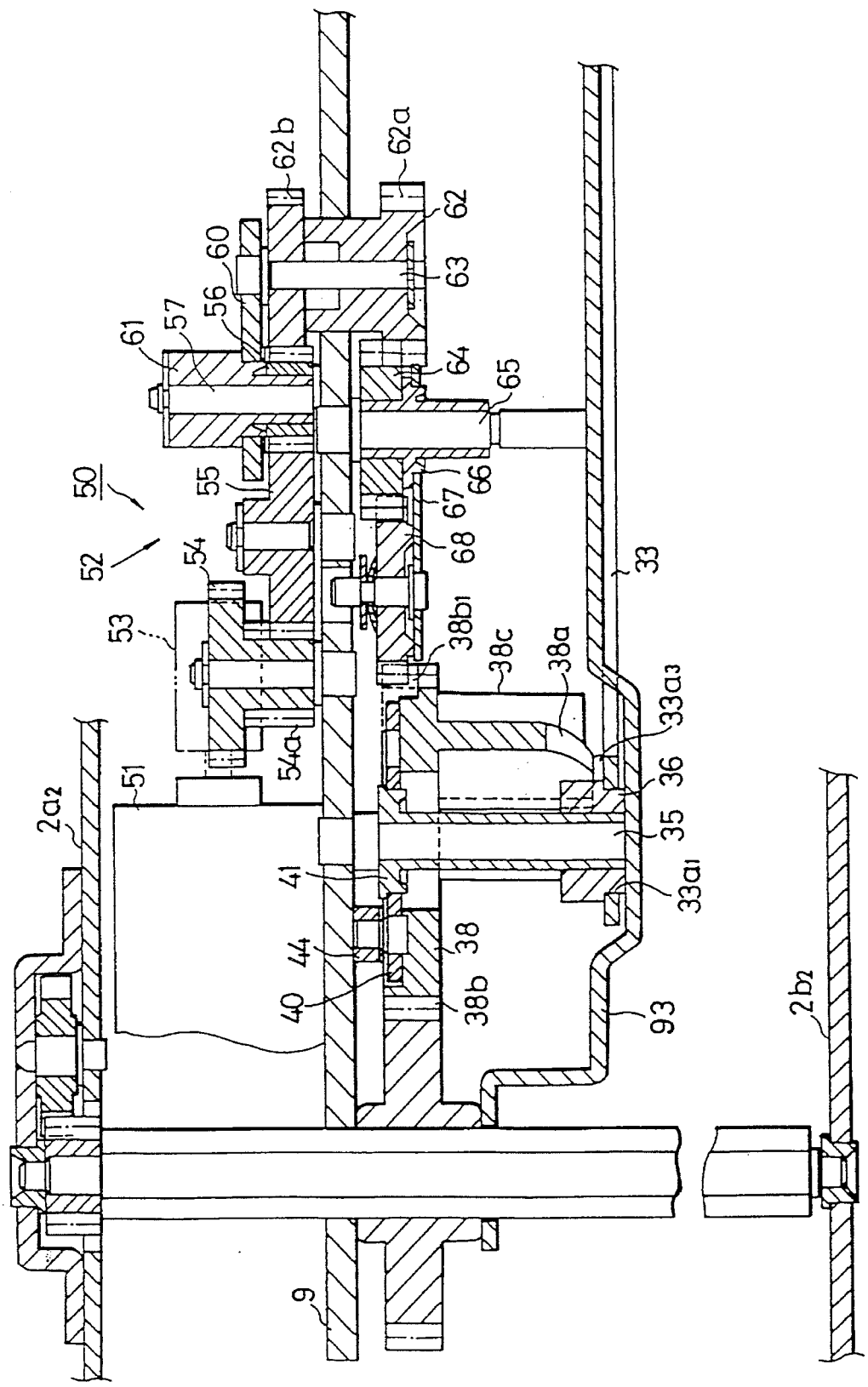
FIG. 4 is a fragmentary cross-sectional view of a cam rotating mechanism.

The chuck mechanism 33 includes a chuck arm 33a supporting a chuck member 34 on its end corresponding to the turntable 31a. The chuck member 34 can be attracted by a magnet on the turntable 31a for chucking a disc D placed on the turntable 31a. The chuck arm 33a has a shaft hole $33a_1$ defined in an end thereof remote from the chuck member 34. As also shown in FIG. 4, a support shaft 35 mounted perpendicularly on the movable chassis 9 is fitted at one end in the shaft hole $33a_1$ through a slide boss 36. The chuck arm 33a also has a recess $33a_2$ spaced from the shaft hole $33a_1$ and receiving a pin 37 projecting from the movable chassis 9. The chuck arm 33a includes a slide member $33a_3$ extending around the shaft hole $33a_1$ and slidably held against a cam surface 38a of a cam gear 38 supported on the support shaft 35. As shown in FIG. 4, the cam gear 38 has gear teeth 38b including a tooth-free recess $38b_1$, and a cylindrical cam 38c disposed around the cam surface 38a.

When the cam gear 38 rotates, the slide member $33a_3$ of the chuck arm 33a moves along the cam surface 38a to cause the chuck arm 33a toward and away from the disc playback unit 7 substantially parallel thereto, thereby bringing the chuck member 34 into and out of contact with the turntable 31a.

The chuck arm 33a is normally biased toward the disc playback unit 7 by a presser 39 (see FIG. 1) to keep the slide member $33a_3$ in pressed sliding contact with the cam surface 38a of the cam gear 38. The presser 39 comprises a pressing member having an end attached to the chuck arm 33a near the support shaft 35 and held against an outer surface of the chuck arm 33a which extends from the support shaft 35 up to a substantially central region of the chuck arm 33a, and a spring for urging the pressing member against the chuck arm 33a.

As shown in FIG. 4, the cam gear 38 is fixed to a cam base 40 remotely from the cam surface 38a. A cam base boss 41 is fitted centrally in the cam base 40 and rotatably fitted over the support shaft 35. Thus, the cam gear 38 is rotatably supported on the support shaft 35. The slide boss 36 fitted in the shaft hole $33a_1$ of the chuck arm 33a is axially slidably fitted over the cam base boss 41.

As shown in FIG. 1, a substantially horseshoe-shaped disc presser 42 is disposed around the turntable 31a of the disc rotating mechanism 31. The disc presser 42 is axially movable toward the turntable 31a by a drive member 43 that is actuated by rotation of the cam gear 38. The disc presser 42 thus axially moved and the chuck member 34 of the chuck arm 33a jointly sandwich a disc D therebetween, and move the disc D toward and away from the turntable 31a. The disc presser 42 is normally urged to a position behind, i.e., rearwardly of, the turntable 31a.

Figure 5:
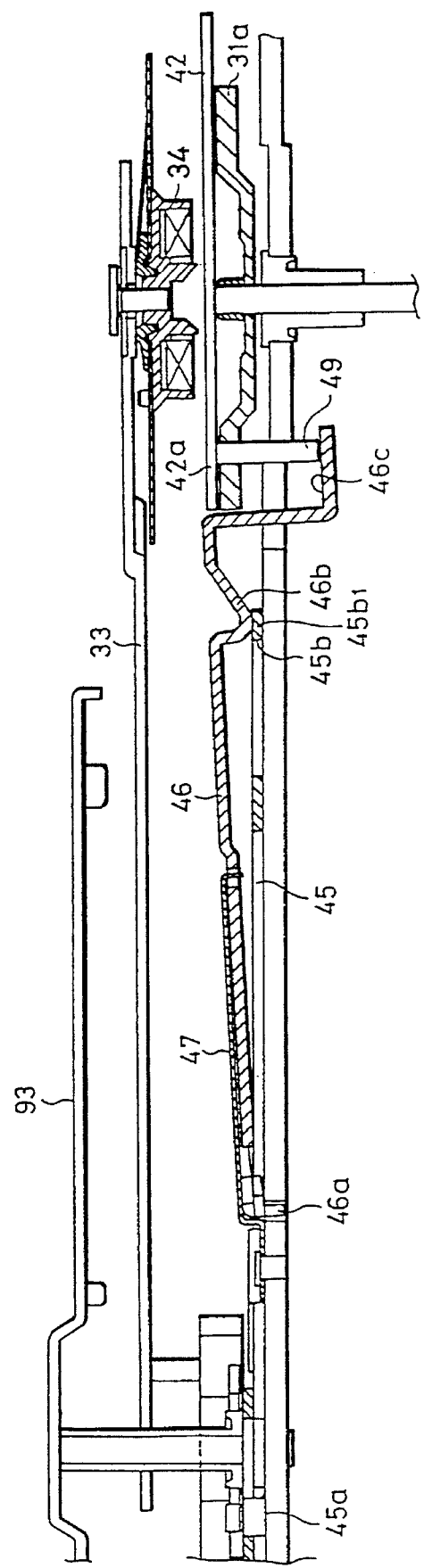
FIG. 5 is a fragmentary cross-sectional view of a disc chuck mechanism.
Figure 6:
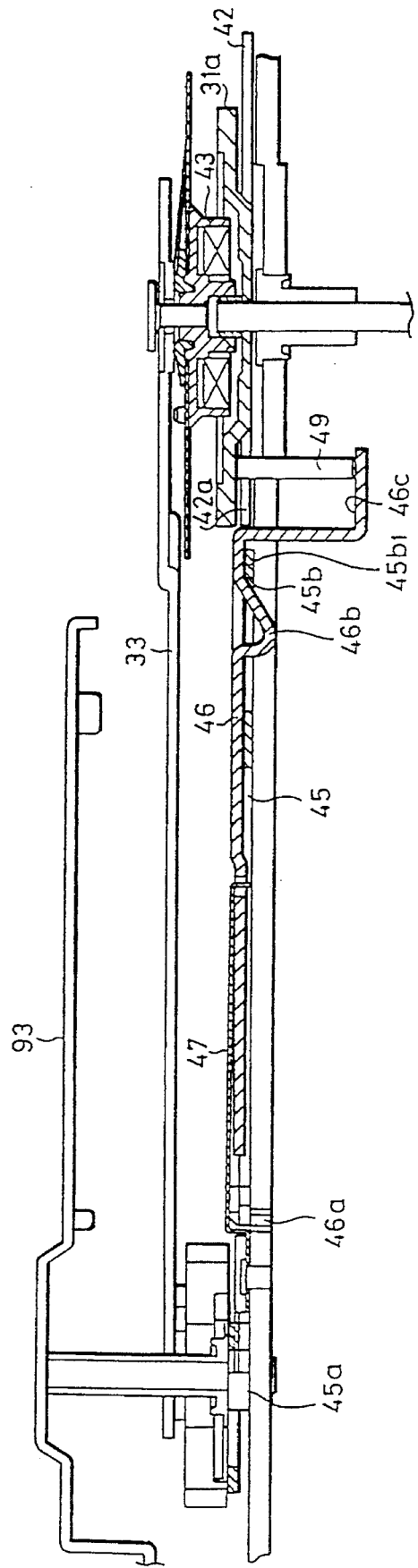
FIG. 6 is a fragmentary cross-sectional view showing the manner in which the chuck mechanism operates.

As also shown in FIGS. 5 and 6, the drive member 43 for the disc presser 42 comprises a disc presser drive lever 45 engaged by a roller 44 rotatably supported on the cam base 40 and slidable by rotation of the cam gear 38, a disc presser turning arm 46 disposed in superposed relationship to the disc presser drive lever 45 and movable toward and away from the disc presser drive lever 45 in response to sliding movement thereof, and a turning arm presser spring 47 for pressing the disc presser turning arm 46 toward the disc presser drive lever 45.

As shown in FIGS. 5 and 6, the disc presser drive lever 45 has a guide hole 45a defined in an end thereof, with the roller 44 engaging in the guide hole 45a. The disc presser drive lever 45 also has a rectangular window hole 45b defined in an opposite end thereof.

The disc presser turning arm 46 has an engaging end 46a held in engagement with the movable chassis 9, and also has, on an opposite end portion thereof, a raised sliding member 46b near the window hole 45b of the disc pressure drive lever 45. The disc presser turning arm 46 is normally pressed against the disc presser drive lever 45 by the turning arm presser spring 47 which has an end fixed to the movable chassis 9. As shown in FIG. 1, a return spring 48 is connected between the disc presser drive lever 45 and the disc presser turning arm 46 for normally urging the disc presser drive lever 45 to return in a direction to cause the sliding member 46b to enter the window hole 45b.

The disc presser turning arm 46 has an end surface 46c (see FIGS. 5 and 6) confronting an end surface 42a of the disc presser 42 with a pusher rod 49 interposed therebetween, the pusher rod 49 projecting from the end surface 42a. When the disc presser drive lever 45 is slid by the roller 44 in response to rotation of the cam gear 38, a marginal edge 45b₁ of the window hole 45b abuts against the sliding member 46b of the disc presser turning arm 46. The sliding member 46b now rides on the marginal edge 45b₁ of the window hole 45b, causing the disc presser turning arm 46 to be angularly lifted about the engaging end 46a to move its distal end away from the disc presser drive lever 45 against the bias of the presser spring 47. The end surface 46c pushes the pusher rod 49 to move the disc presser 42 forwardly away from the surface of the turntable 31a, whereupon the disc presser 42 cooperates with the chuck member 34 to sandwich a disc D (see FIG. 5).

On further rotation of the cam gear 38, the chuck member 34 is caused to move toward the turntable 31a by the chuck arm 33a. The disc presser drive arm 45 is released from the roller 44 and returns under the bias of the return spring 48 until the window hole 45b is aligned with the sliding member 46b. The disc presser turning arm 46 is then displaced toward the disc presser drive lever 45, releasing the disc presser 42. The disc presser 42 is moved rearwardly of the turntable 31a, permitting the disc D to be held against and chucked on the turntable 31a (see FIG. 6).

A cam rotating mechanism 50 for rotating the cam gear 38 will be described below with reference to FIG. 4. The cam rotating mechanism 50 generally comprises a motor 51 mounted on the reverse side of the movable chassis 9 opposite the cam gear 38, and a transmission gear train 52 mounted on the opposite sides of the movable chassis 9.

A worm 53 is mounted on the shaft of the motor 51 and held in mesh with a worm wheel 54 having a small-diameter gear 54a meshing with an intermediate gear 55. The intermediate gear 55 is held in mesh with a transmission gear 56 having a shaft 57 on which there is supported by a boss 61 a switching lever 60 that can be switchingly moved by a plunger 58 (see FIG. 1) through an actuating arm 59. The switching lever 60 supports a switching gear assembly 62 on a shaft 63. The switching gear assembly 62 comprises a face gear 62a disposed on the face side of the movable chassis 9 where the cam gear 38 is supported, and a back gear 62b disposed on the reverse side of the movable chassis 9 where the motor 51 is supported, the back gear 62b being held in mesh with the transmission gear 56.

A drive gear 64 is supported on the face side of the movable chassis 9 by a shaft 65 through a boss 66 to which a drive gear arm 67 is attached. The drive gear 64 is held in mesh with a drive intermediate gear 68 rotatably supported with friction on the drive gear arm 67. The drive intermediate gear 68 has its gear teeth positioned in the tooth-free recess 38b₁ in the gear teeth 38b of the cam gear 38. When the motor 51 is energized, its rotation is transmitted through the transmission gear train 52 to the drive intermediate gear 68, which is turned with the drive gear arm 67 into mesh with the gear teeth 38b of the cam gear 38, whereupon the cam gear 38 starts to rotate.

Figure 7:
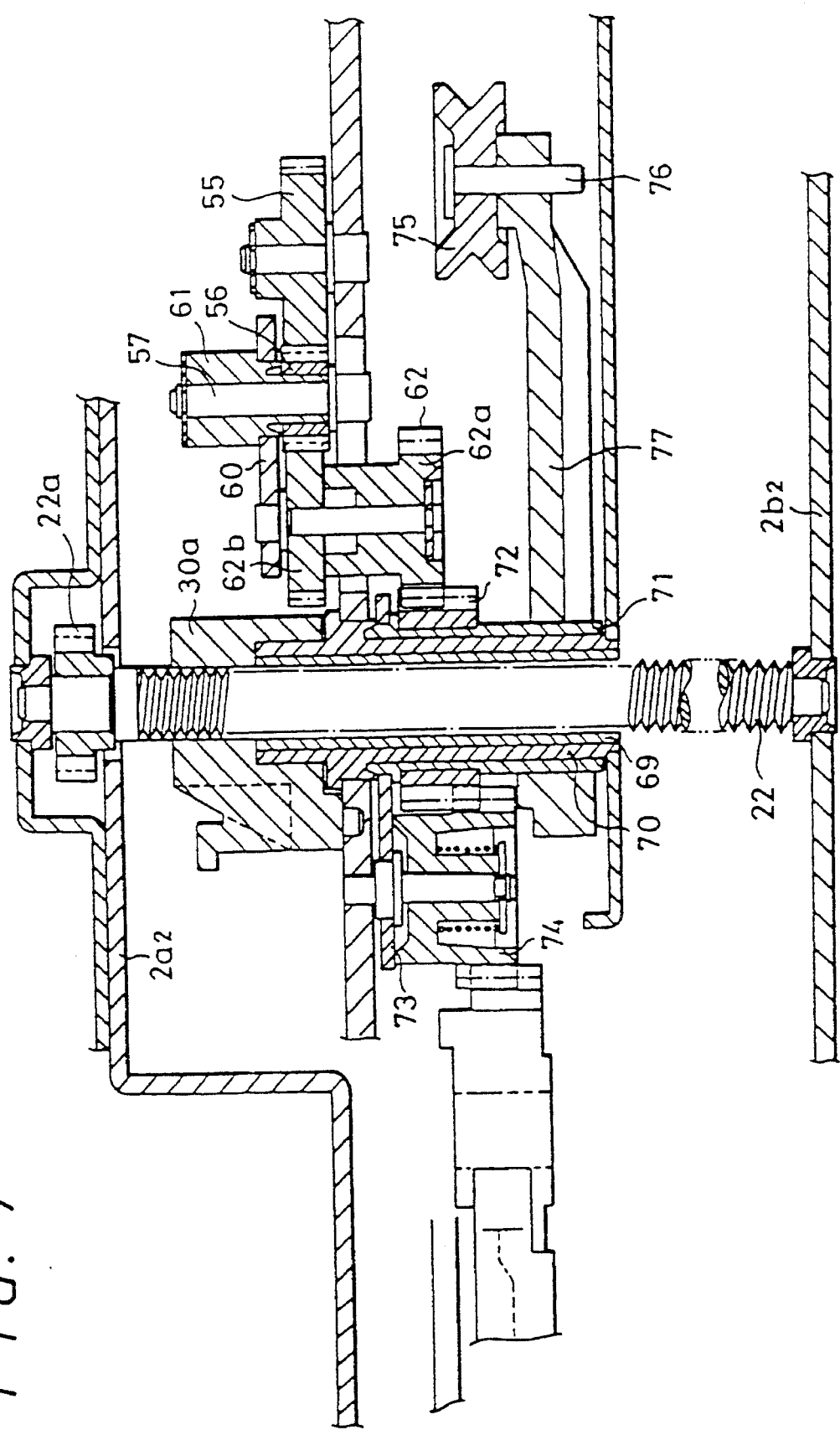
FIG. 7 is a fragmentary cross-sectional view of a disc feed mechanism.

As shown in FIG. 7, a boss 70 fitted over feed screw 22 through a guide bearing 69 is mounted on and projects from the face side of movable chassis 9, and a shaft sleeve 71 is rotatably fitted over the boss 70. The disc feed mechanism 8 has a disc withdrawing drive gear 72 fitted over the shaft sleeve 71. A gear arm 73 is fixed to the shaft sleeve 71, and a drive intermediate gear 74 held in mesh with the disc withdrawing drive gear 72 is frictionally supported on the gear arm 73.

When the switching arm 60 effects a switching operation, the face gear 62a of the switching gear assembly 62 is brought into mesh with the disc withdrawing drive gear 72 to transmit rotation of the motor 51 to the disc withdrawing drive gear 72. The drive intermediate gear 74 is now rotated to turn and withdraw a tray from the disc cartridge.

A holding pulley 75 for holding the peripheral edge of a disc D is rotatably supported on a holding arm 77 that is rotatably supported on the shaft sleeve 71 by a pin 76. The holding arm 77 is normally urged to turn toward the cartridge housing unit 5 under the bias of a tension coil spring 78 (see FIG. 1). When a tray is turned and withdrawn from the disc cartridge, the disc D carried on the tray abuts against the holding pulley 75 and hence is pushed and held in the tray. As the tray is withdrawn under this condition, the holding arm 77 is angularly moved against the force of the tension spring 78, and the disc D together with the tray is stably fed toward the disc playback unit 7.

The turning movement of the holding arm 77 actuates a disc withdrawal detecting switch Sa to confirm that the disc D has been withdrawn from the disc cartridge.

Figure 8:
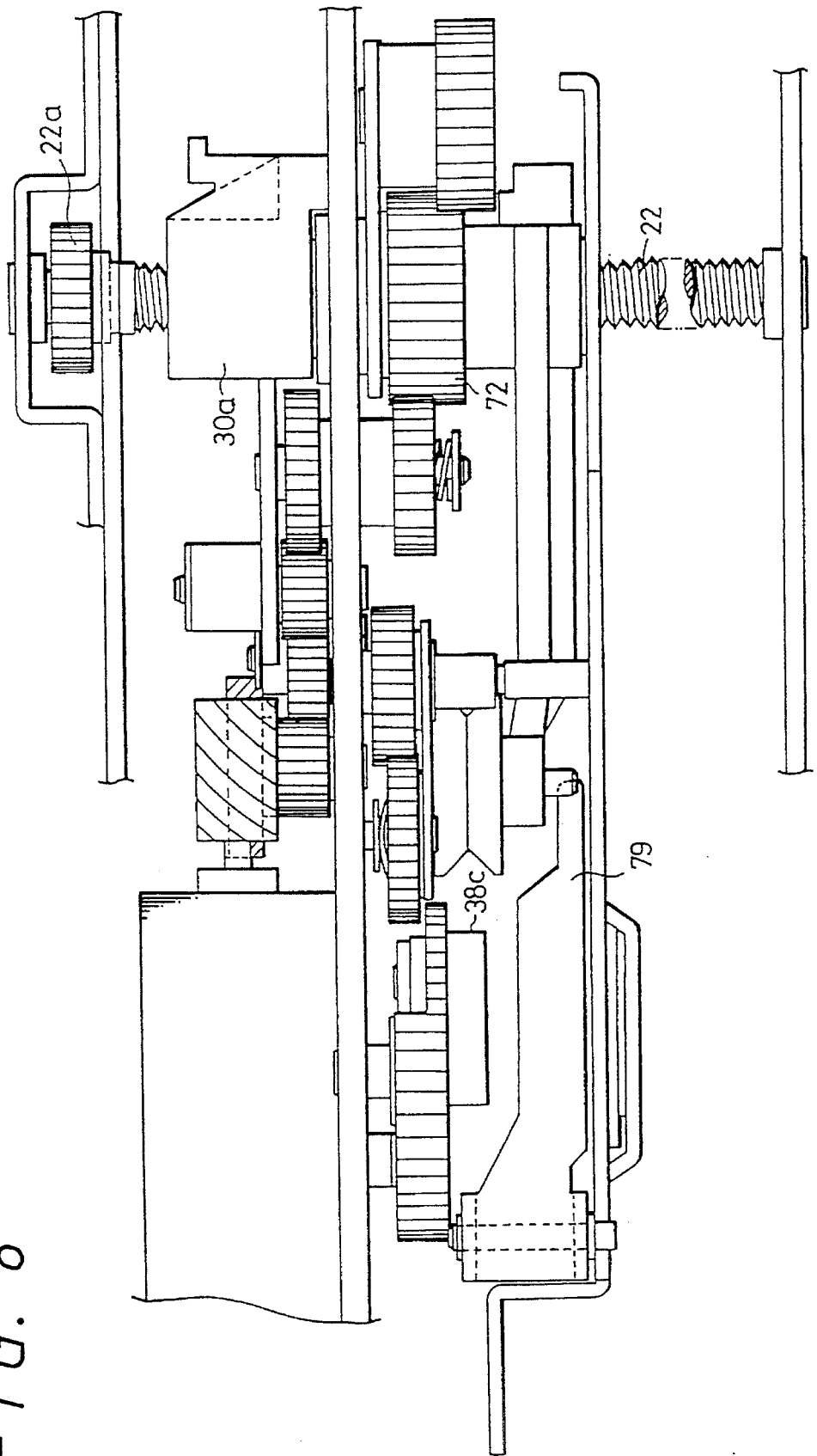
FIG. 8 is a fragmentary side elevational view of the cam rotating mechanism.

When the disc D is in a chucking position, i.e., positioned between the turntable 31a and the chuck member 34, the switching arm 60 switchingly operates to transmit the driving force to rotate the cam gear 38. When the cam gear 38 rotates, the chuck arm 33a is moved toward the turntable 31a, and the disc presser 42 moves forwardly away from the surface of the turntable 31a and cooperates with the chuck member 34 in sandwiching the disc D. At this time, a release plate 79 (see FIG. 8) is pushed and turned outwardly by the cylindrical cam surface 38c of the cam gear 38 to turn and push the holding arm 77 outwardly, thus holding the holding pulley 75 off the peripheral edge of the disc D.

Continued rotation of the cam gear 38 causes the chuck arm 33a toward move to the turntable 31a while sandwiching the disc D against the disc presser 42. The chuck arm 33a removes the disc D from the tray, places the disc D on the turntable 31a, and causes the chuck member 34 to chuck the disc D. Since the drive lever 45 is now released from the roller 44, the disc presser 42 is returned under the bias of the return spring 48. The turning arm 46 is released and moved onto the drive lever 45, thus releasing the disc presser 42, which is allowed to move rearwardly from the turntable 31a and hence away from the disc D.

When the disc D is chucked on the turntable 31a, it is then played back by the disc playback unit 7.

After the disc D is played back, the above process is reversed to position the disc D back on the tray, and the disc D carried on the tray is stored back into the disc cartridge in the cartridge housing unit 5.

The mechanical chassis 2 which includes the cartridge housing unit 5 and the movable chassis 9 that supports the disc playback unit 7 and the disc feed mechanism 8 is resiliently, i.e., swingably, supported in the outer housing 1 for increased vibration resistance. When the disc player is not in use, or when the disc cartridge is loaded into or unloaded from the cartridge housing unit 5, it is necessary to securely hold the mechanical chassis 2 against swinging movement in the outer housing 1. To meet such a requirement, the mechanical chassis 2 has a holding mechanism 80, as shown in FIGS. 1 and 2.

The holding mechanism 80 comprises lock hooks 82a, 82b rotatably mounted respectively on the side plates 2a, 2b of the mechanical chassis 2, specifically at lower front, central, and rear end portions thereof, the lock hooks 82a, 82b being interconnected by connecting rods 81 and having ends held against inner front, rear, and lower surfaces of the outer housing 1. The holding mechanism 80 also comprises lock hooks 83a, 83b rotatably mounted respectively on the side plates 2a, 2b at upper central portions thereof and engageable in holes 1b defined in the upper wall of the outer housing 1. These lock hooks 82a, 82b, 83a, 83b can simultaneously be turned into engagement with the outer housing 1 for holding the mechanical chassis 2 against swinging movement in the outer housing 1.

Figure 10:
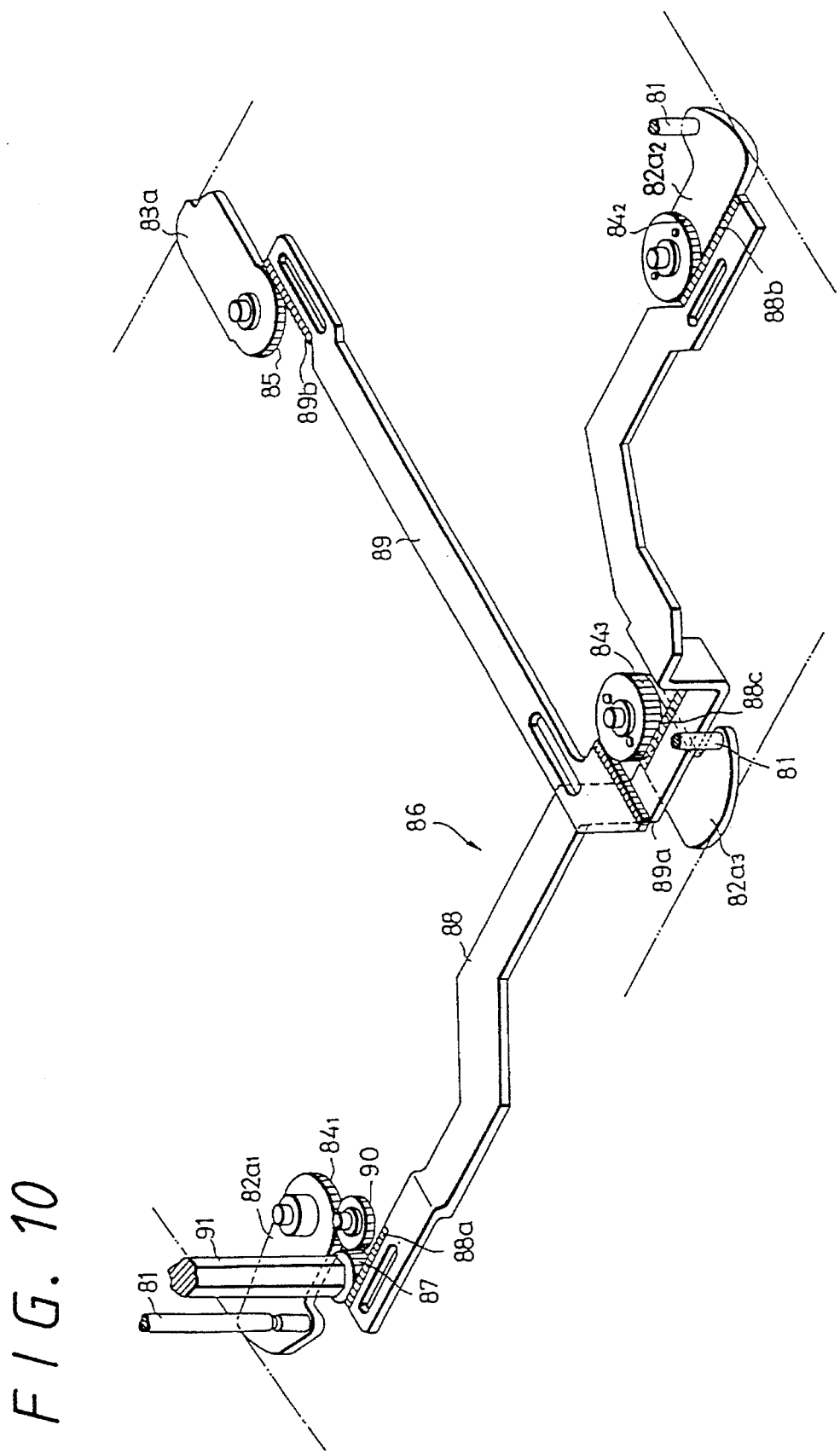
FIG. 10 is a fragmentary perspective view of a holding mechanism.

The lock hooks 82a include lock hooks $82a_1$, $82a_2$, $82a_3$ mounted on the side plate 2a. As shown in FIG. 10, the lock hooks $82a_1$, $82a_2$, $82a_3$ and 83a have respective gears $84_1$, $84_2$, $84_3$, 85 whose centers are aligned with the axes of rotation of their lock hocks. The gears $84_1$, 85 of the lock hooks $82a_1$, 83a at the lower front and upper central portions respectively of the side plate 2a are formed integrally with peripheral surfaces of these lock hooks. The gears $84_2$, $84_3$ of the lock hooks $82a_2$, $82a_3$ at the lower rear and central portions respectively of the side plate 2a are formed separately from and secured to these lock hooks. The lock hooks $82a_1$, $82a_2$, $82a_3$ and 83a are operatively coupled to each other by an interlink mechanism 86.

The interlink mechanism 86 comprises a lock link 88, which slides in a vertical plane, held in engagement with the side plate 2a and having rack teeth 88a, 88b, 88c meshing respectively with a drive gear 87 rotatably supported on the side plate 2a near the lock hook $82a_1$ and the gears $84_2$, $84_3$ of the lock hooks $82a_2$, $82a_3$, and a lock link 89, which slides in a vertical plane, held in engagement with the side plate 2a perpendicularly to the lock link 88 and having rack teeth 89a, 89b meshing respectively with the gear $84_3$ of the lock hook $82a_3$ and the gear 85 of the lock hook 83a.

Figure 11:
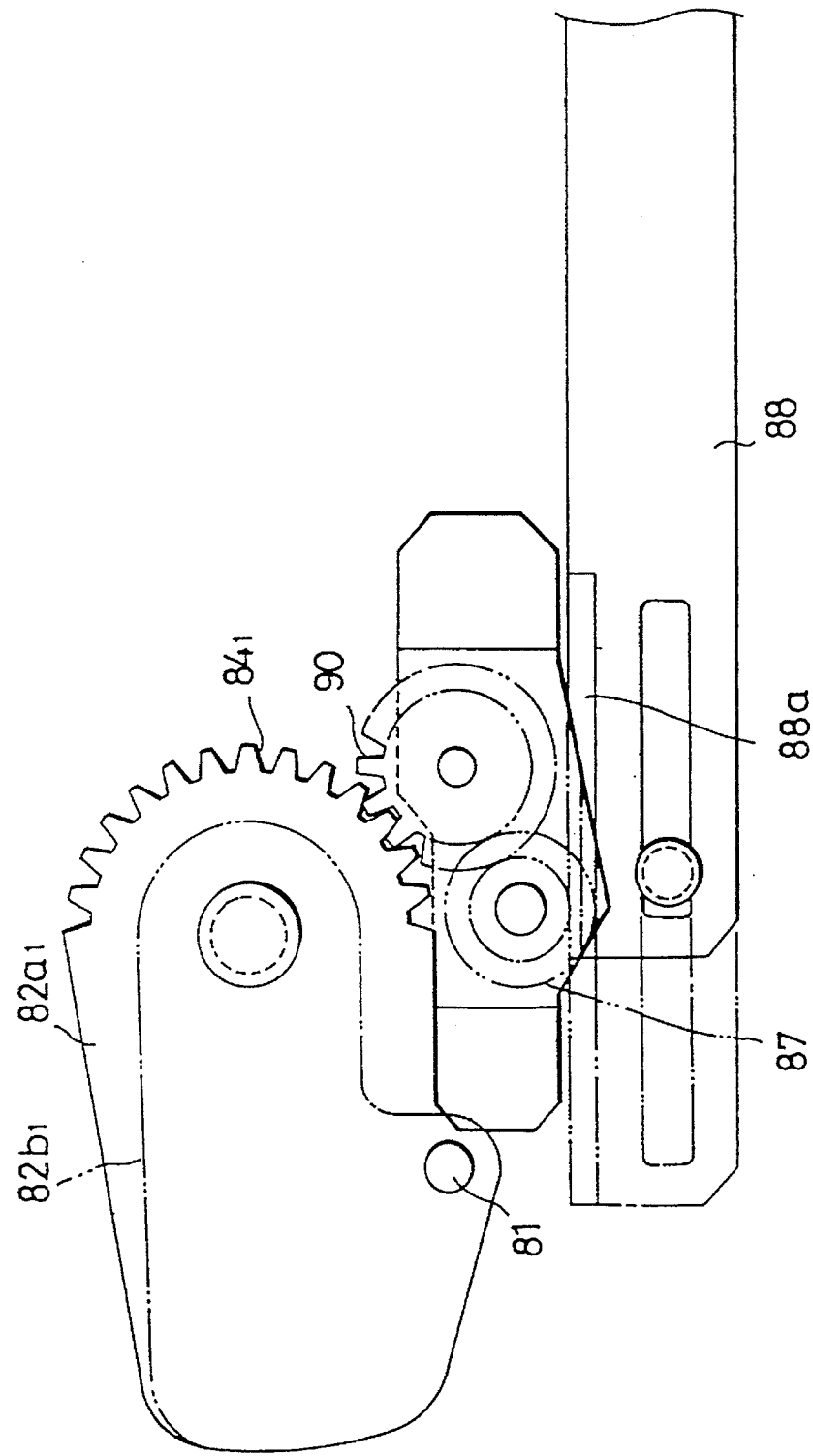
FIG. 11 is an enlarged fragmentary side elevational view of a portion of the holding mechanism.
Figure 12:
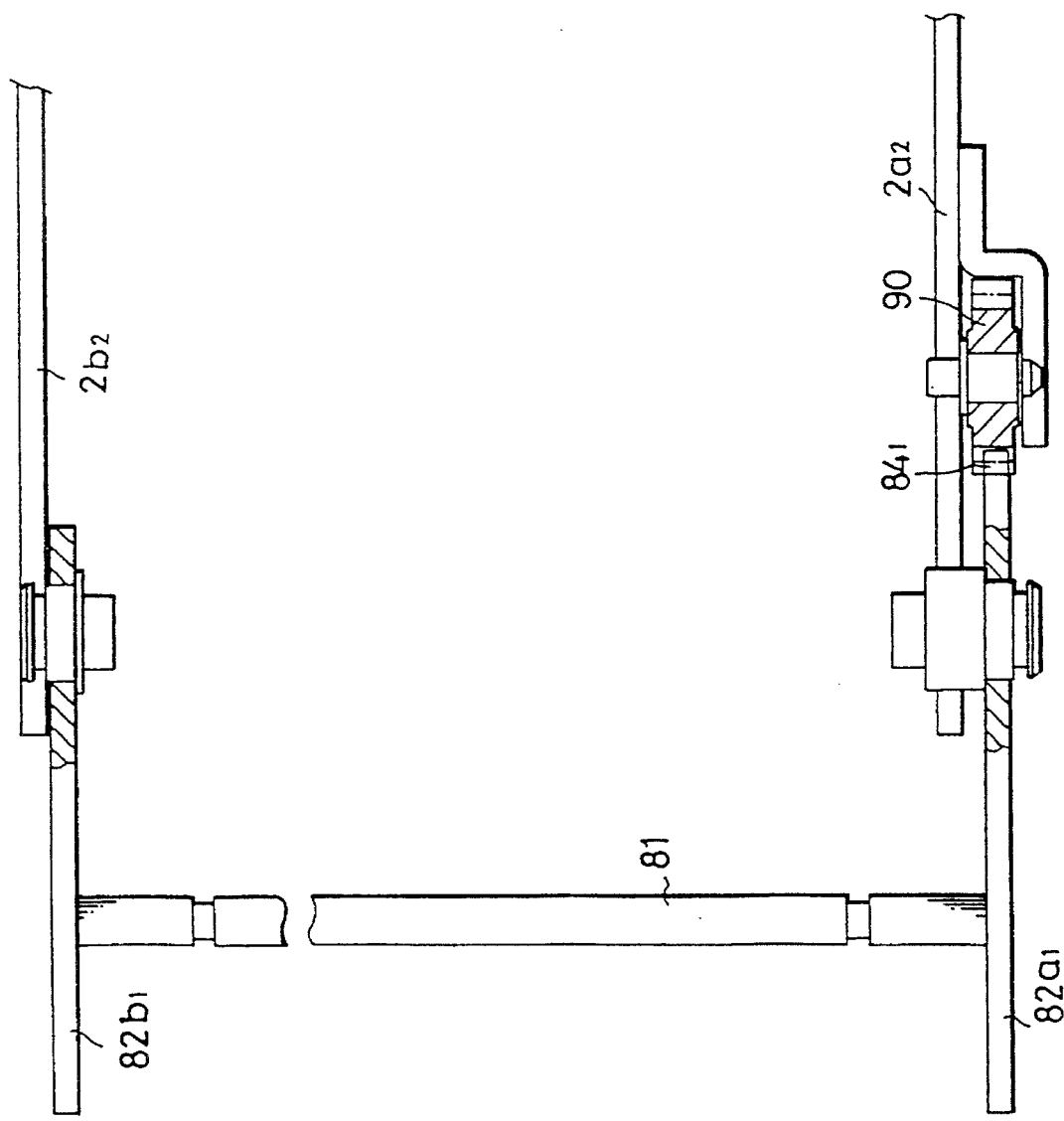
FIG. 12 is a fragmentary plan view of a portion of the holding mechanism.

A drive intermediate gear 90 is positioned between and meshes with the gear $84_1$ of the lock hook $82a_1$ and the drive gear 87 (see also FIGS. 11 and 12).

A drive shaft 91 of a hexagonal cross-sectional shape which extends through the movable chassis 9 has an end fixed to the drive gear 87 and an opposite end rotatably supported on the other side by plate 2b. A drive transmission gear 92 supported on the movable chassis 9 and meshing with the gear 38b of the cam gear 38 is fitted over the drive shaft 91 such that it engages along its circumference and slides in an axial direction. The drive gear 92 and other gears are held against and supported on the movable chassis 9 by a presser plate 93 (see FIG. 4).

The lock hooks $82a_1$, $82a_2$, $82a_3$, 83a, $82b_1$, $82b_2$, $82b_3$, 83b of the holding mechanism 80 are normally held against the inner surfaces of the outer housing 1 to hold the mechanical chassis 2 against swinging movement, i.e., fixedly, in the outer housing 1. Therefore, the disc cartridge can stably and reliably be loaded into and unloaded out of the cartridge housing unit 5.

When the cam gear 38 is rotated to chuck a disc D, as described above, the drive transmission gear 92 meshing with the cam gear 38 is rotated, thus rotating the drive shaft 91 and the drive gear 87. The rotation of the drive gear 87 is transmitted through the drive intermediate gear 90 to the lock hook $82a_1$. At the same time, the lock link 88 is translated by the rack teeth 88a meshing with the drive gear 87, causing the rack teeth 88b, 88c to turn the lock hooks $82a_2$, $82a_3$, respectively.

The angular movement of the lock hook $82a_3$ causes the rack teeth 89a meshing therewith to translate the lock link 89, turning the lock hook 83a.

The angular movement of the lock hooks on the side plate 2a is transmitted through the connecting rods 81 to the lock hooks $82b_1$, $82b_2$, $82b_3$ on the other side plate 2b. The angularly movement of the lock hook $82b_3$ is transmitted through a connecting member to the lock hook 83b. Consequently, the lock hooks on the side plates 2a, 2b are simultaneously turned out of abutting engagement with the corresponding inner surfaces of the outer housing 1.

When the lock hooks on the side plates 2a, 2b are out of abutting engagement with the outer housing 1, the mechanical chassis 2 is unlocked from the outer housing 1, i.e., is floatingly and resiliently supported in the outer housing 1. Since no substantial vibration is transmitted from the outer housing 1 to the mechanical chassis 2, at this time, the disc D can stably and reliably be played back by the disc playback unit 7 supported on the mechanical chassis 2.

When the disc D is returned to the disc cartridge after it has been played back, the above process of unlocking the mechanical chassis 2 is reversed to bring the lock hooks into locking engagement with the inner surfaces of the outer housing 1. The mechanical chassis 2 is now fixedly locked with respect to the outer housing 1 again.

Figure 13:
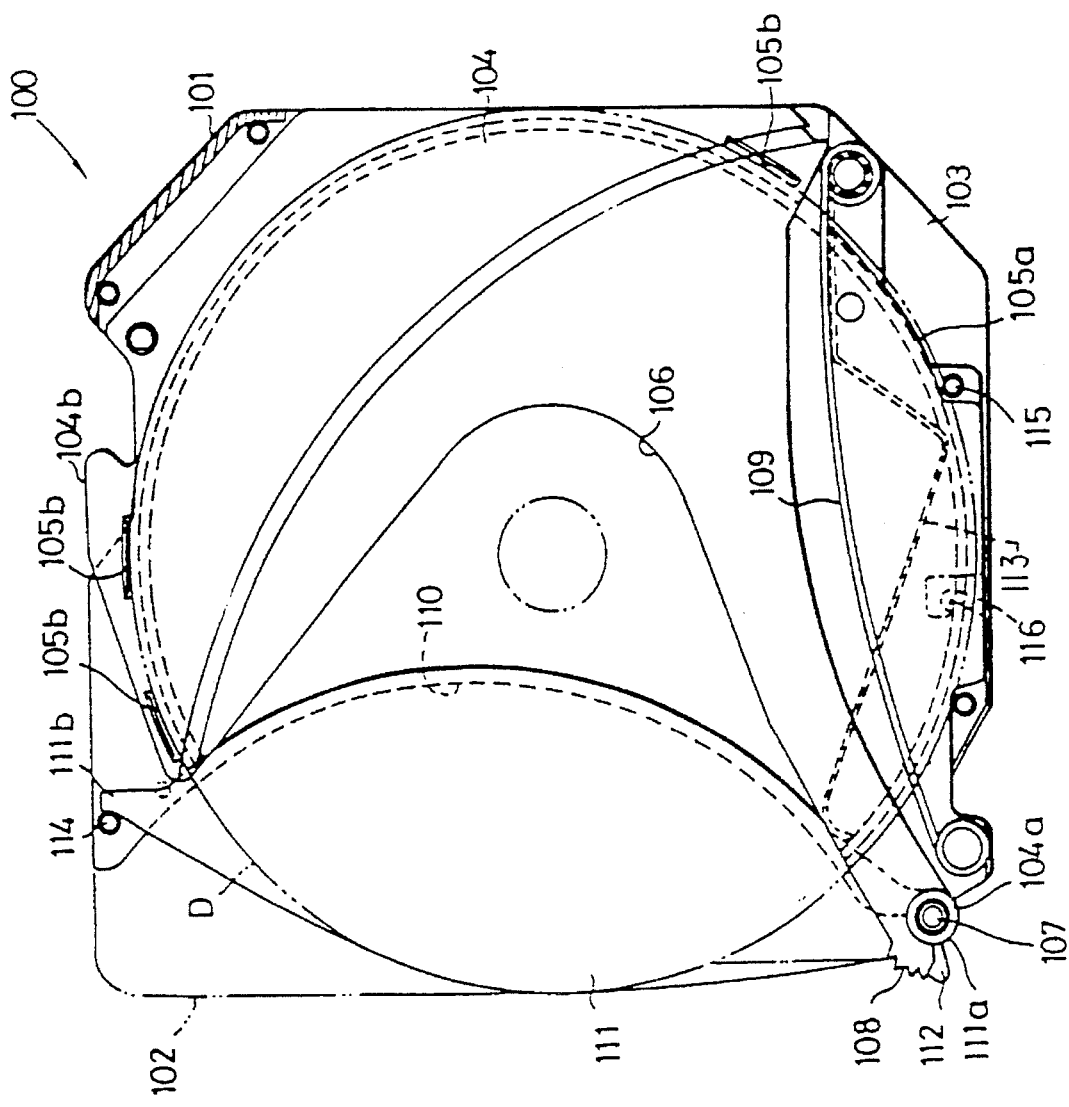
FIG. 13 is a side elevational view, partly omitted from illustration, of a disc cartridge.
Figure 14:
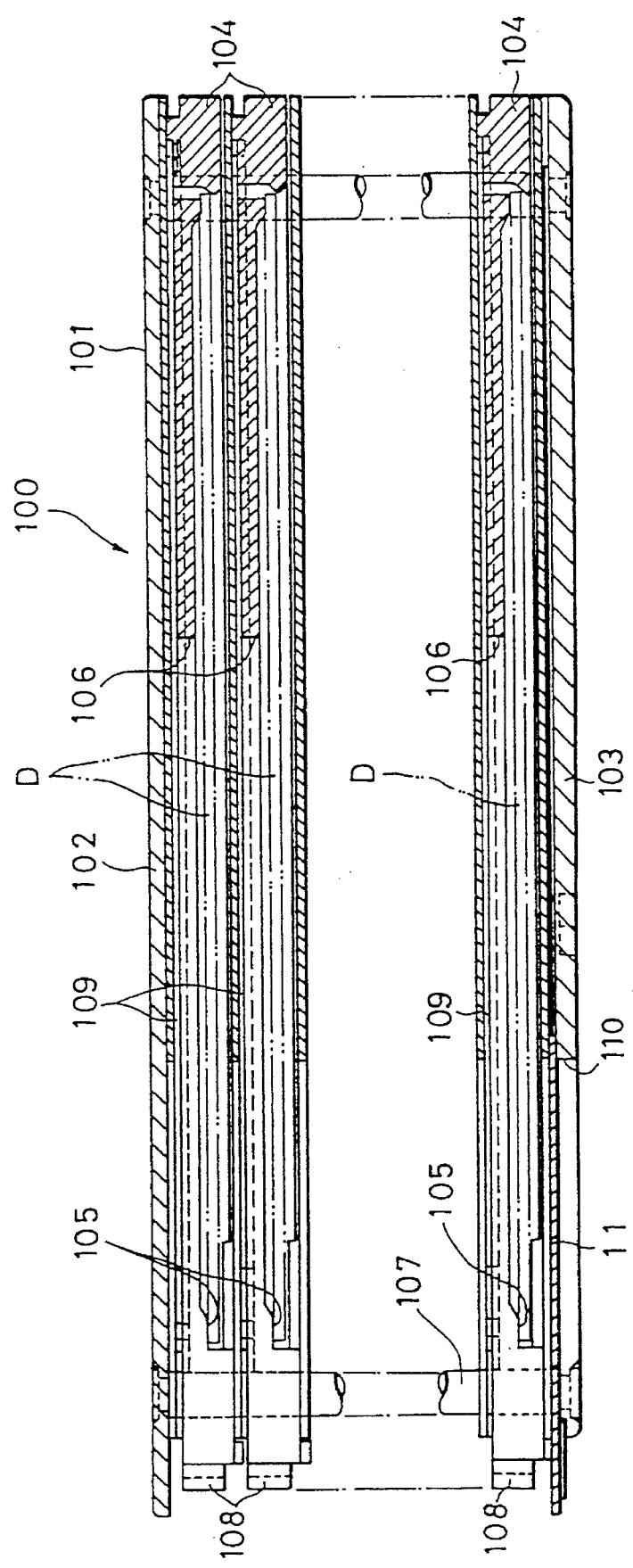
FIG. 14 is a cross-sectional view, partly omitted from illustration, of the disc cartridge.
Figure 15A:
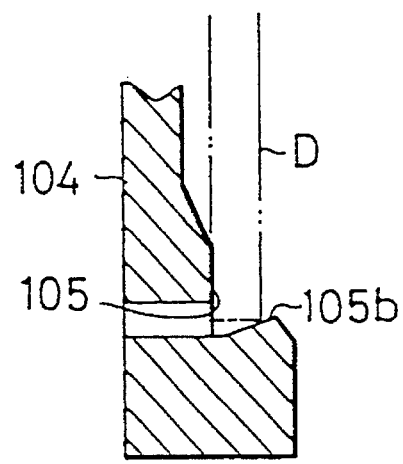
FIGS. 15A through 15D are enlarged fragmentary cross-sectional views of portions of the disc cartridge.
Figure 15B:
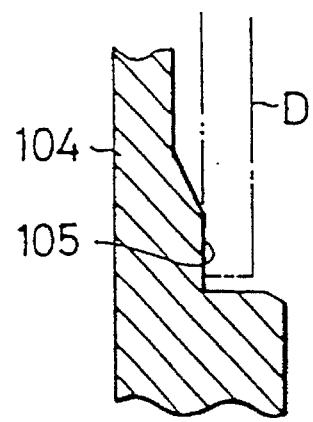
Figure 15C:
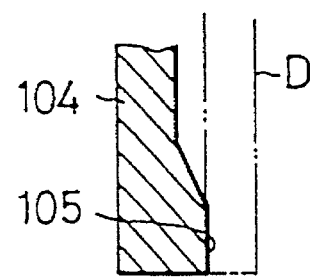
Figure 15D:
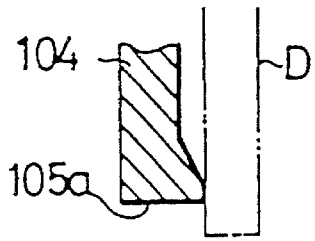

The disc cartridge to be loaded in the cartridge housing unit 5 in the mechanical chassis 2 is of a structure as shown in FIGS. 13 and 14.

The disc cartridge, generally denoted at 100 in FIGS. 13 and 14, comprises a casing 101 composed of a face plate 102 and a back plate 103 joined to each other in spaced-apart relationship to each other. The casing 101 houses a stack of trays 104 rotatably supported therein and carrying respective discs D.

As also shown in FIGS. 15A through 15D, each of the trays 104 comprises a flat panel having a disc storage region 105 defined as a recess in a back side thereof and a substantially V-shaped recess 106 defined in a front edge thereof and extending toward the center thereof. The tray 104 also has a recess 105a defined in a side thereof for exposing the disc D therethrough, and disc engaging edges 105b on a peripheral edge of the disc storage region 105 which is diametrically opposite to the recess 105a and also on a rear edge of the disc storage region 105.

The tray 104 includes a bearing 104a rotatably supported in the casing 101 by a shaft 107. The bearing 104a has, on its front edge, a gear 108 for meshing with the disc withdrawing drive gear 72 of the disc feed mechanism 8. The tray 104 also includes a positioning edge 104b opposite to the bearing 104a.

Each of the trays 104 is normally urged in a direction to be stored in the casing 101 by a torsion spring 109 acting between the casing 101 and the tray 104.

The back plate 103 of the casing 101 has an arcuate cavity 110 defined in a front edge thereof and extending from a front opening of the casing 101 toward the center of the back plate 103. A lid 111 for closing the cavity 110 is pivotally mounted at one end 111a thereof on the shaft 107 by which the trays 104 are supported. The lid 111 is shaped such that it is displaced out of the cavity 110 when it is opened. The pivoted end 111a of the lid 111 has an engaging finger 112 on its front edge which is engageable by an abutment 94 (see FIG. 17) disposed in the cartridge housing unit 5, i.e., projecting on the side plate portion $2a_1$ of the side plate 2a in the half region 2A of the mechanical chassis 2.

As shown in FIG. 13, the lid 111 is normally urged to close the cavity 110 by a torsion spring 113 having one end secured to the back plate 103. When the lid 111 closes the cavity 110, a freed end 111b thereof is engaged by a connecting rod 114 which is positioned on the front edge of the back plate 103 and by which the back plate 103 is coupled to the face plate 102.

Between the face and back plates 102, 103 of the casing 101, there extends a disc holder rod 115 for engaging a peripheral edge of the disc D which is exposed through the recess 105a when the tray 104 is stored in the disc cartridge 100. The back plate 103 has a recess 116 defined in an outer marginal edge for lockingly receiving the lock pin 11 on the lock lever 13 in the cartridge housing unit 5 (see FIG. 16).

Figure 16:
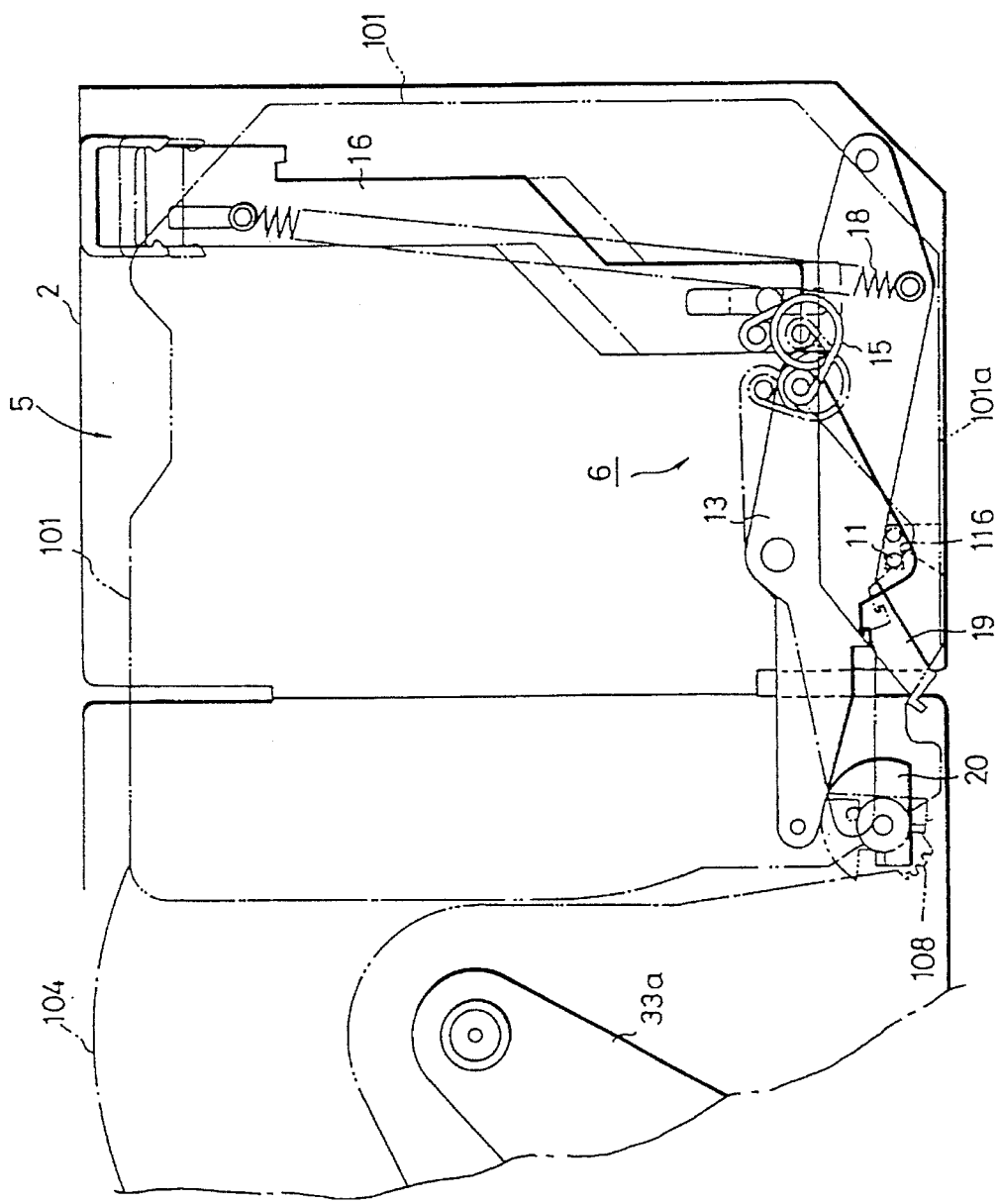
FIG. 16 is a side elevational view of a locking and ejecting mechanism.

The disc cartridge 100 is loaded into the automatic disc changer as follows: As shown in FIG. 16, the casing 101 is inserted, with one side 101a ahead, into the cartridge housing unit 5 in the mechanical chassis 2 through the insertion slot 1a in the outer housing 1. When the casing 101 is pushed into the cartridge housing unit 5, it pushes the eject lever 19 of the locking and ejecting mechanism 6 downwardly against the bias of the tension spring 18. The lock lever 13 is caused to swing under the resiliency of the torsion spring 15 for thereby moving the lock pin 11 into locking engagement in the recess 116, whereupon the casing 101 is locked in the cartridge housing unit 5.

Figure 17:
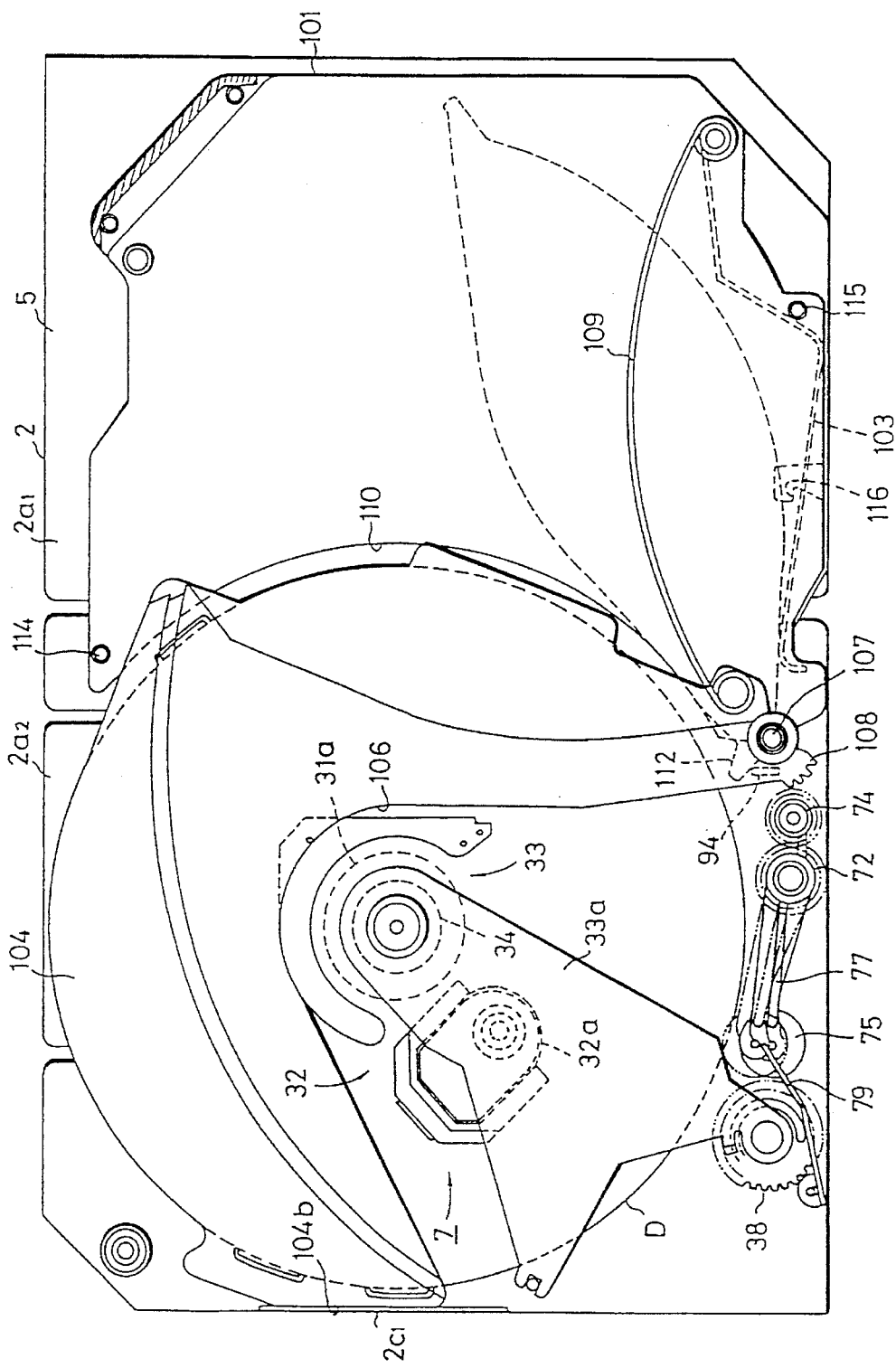
FIG. 17 is a side elevational view showing the manner in which a disc is chucked.

Upon the loading of the casing 101 into the cartridge housing unit 5, the engaging finger 112 of the pivoted end 111a of the lid 111 is engaged and pushed by the abutment 94 in the cartridge housing unit 5, so that the lid 111 is turned against the bias of the torsion spring 113, opening the cavity 110 in the back plate 103 (see FIG. 17). With the casing 101 loaded in the cartridge housing unit 5, the gears 108 of the respective trays 104 are positioned for mesh with the drive intermediate gear 74 held in mesh with the disc withdrawing drive gear 72 of the disc feed mechanism 8 on the movable chassis 9. The discs D carried by the respective trays 104 are detected when their peripheral edges exposed through the recesses 105a are contacted by the disc detecting switch Sd.

A selected one of the discs D which are carried respectively by the stacked trays 104 in the casing 101 of the disc cartridge 100 loaded in the cartridge housing unit 5 is played back as follows: When a desired disc D to be played back is specified, the motor 21 of the chassis moving mechanism 10 for moving the movable chassis 9 is energized to rotate the two feed screws 22, 23 through the transmission gear train 24. When the feed screws 22, 23 are rotated, the movable chassis 9 which supports the disc playback unit 7 and the disc feed mechanism 8 is moved from a standby position to a position corresponding to the desired tray 104 which carries the specified disc D. The movable chassis 9 is stopped when the drive intermediate gear 74 meshes with the gear 108 of the desired tray 104.

When the drive intermediate gear 74 meshes with the gear 108 of the desired tray 104, the plunger 58 has been turned off to switchingly operate the switching arm 60 to bring the face gear 62a of the switching gear assembly 62 into mesh with the disc withdrawing drive gear 72.

When the face gear 62a meshes with the disc withdrawing drive gear 72, the motor 21 is de-energized, and the motor 51 is energized to cause the transmission gear 56 and the switching gear assembly 62 to rotate the disc withdrawing drive gear 72 and hence the drive intermediate gear 74 (see FIG. 7).

As shown in FIG. 17, the tray 104 is turned about the pivoted end 104a on the shaft 107 out of the casing 101 through the front opening thereof into the face side of the movable chassis 9 by the gear 108 meshing with the drive intermediate gear 74. The tray 104 reaches and is held in a tray withdrawal position when the positioning edge 104b abuts against a positioning surface $2c_1$ of the front plate 2c of the mechanical chassis 2.

In this tray withdrawal position, the chuck arm 33a of the chuck mechanism 33 is positioned in the recess 106 of the tray 104, which therefore does not interfere with the chucking operation of the chuck mechanism 33.

While the tray 104 is being withdrawn from the disc cartridge 100, the peripheral edge of the disc D is engaged by the holding pulley 75 and pushed in the disc storage region 105 of the tray 104. Therefore, the disc D is stably held in the disc storage region 105 in engagement with the disc engaging edges 105b thereof as the disc D and the tray 104 are fed toward the chuck mechanism 33.

When the tray 104 reaches the tray withdrawal position facing the chuck mechanism 33, the disc D carried on the tray 104 is released from the holding pulley 75 and hence disengaged from the inner surface of the disc storage region 105 and the disc engaging edges 105b. Then, the plunger 58 is turned on to switchingly operate the switching arm 60 to bring the face gear 62a of the switching gear assembly 62 into mesh with the drive gear 64, to which the rotation of the motor 51 is transmitted. The rotation of the drive gear 64 causes the drive intermediate gear 68 to turn into mesh with the cam gear 38 at one end of the tooth-free recess $38b_1$, and to rotate the cam gear 38 in one direction, thus operating the chuck mechanism 33 to chuck the disc D on the turntable 31a, as described above.

On the chucking operation of the chuck mechanism 33, the lock hooks 82a, 83a, 82b, 83b of the holding mechanism 80 are angularly displaced off the corresponding inner surfaces of the outer housing 1, so that the mechanical chassis 2 resiliently floats in the outer housing 1.

The selected disc D is chucked on the turntable 31a with the disc D and the tray 104 being partly left in the casing 101. The chucked disc D is then rotated by the spindle motor 31b. The optical pickup 32a of the optical reading mechanism 32 is moved radially across the disc D by the pickup moving mechanism including the motor 32b while reading recorded information signals from the disc D, i.e., playing back the disc D.

When the disc playback operation of the optical reading mechanism 32 to read the recorded information signals from the disc D is completed, the motor 51 is reversed to reverse the drive gear 64. The drive intermediate gear 68 is angularly moved by the gear arm 67 into mesh with the gear teeth 38b of the cam gear 38 at the other end of the tooth-free recess 38$b_1$. The cam gear 38 is now rotated in the opposite direction by the drive intermediate gear 68.

When the cam gear 38 is reversed, the chuck mechanism 33 is also reversed in its operation to release the disc D from the turntable 31a. The disc D is stored in the disc storage region 105 of tray 104 that is in the tray withdrawal position. The holding pulley 75 is then pressed against the peripheral edge of the disc D upon the release of the holding arm 77 from the release plate 79 and also under the bias of the tension coil spring 78. The disc D is now held by the tray 104 while engaging in the disc storage region 105.

As the disc D is released from the chuck mechanism 33 and returned to the tray 104, the lock hooks of the holding mechanism 80 are brought into abutment against the inner surfaces of the outer housing 1. The mechanical chassis 2 is now locked, i.e., fixedly supported in the outer housing 1.

When the disc D is returned to the tray 104, or released from the chuck mechanism 33, the plunger 58 is turned off to shift the switching gear 62 again into mesh with the disc withdrawing drive gear 72, which is then reversed by the motor 51 to reverse or rotate the drive intermediate gear 74 in the opposite direction.

The gear 108 of the tray 104 meshes with the reversed drive intermediate gear 74, turning the tray 104 back into the casing 101. The tray 104 is thus stored in the casing 101.

Thereafter, the motor 51 is de-energized, and the motor 21 is energized to actuate the chassis moving mechanism 10. The movable chassis 9 is now moved to a position for withdrawing the tray 104 which carries a next disc D selected, or to a standby position near the side plate 2a of the mechanical chassis 2.

In this manner, any desired tray 104 can be withdrawn from the casing 101 of the disc cartridge 100 loaded in the cartridge housing unit 5 for playing back the disc D carried by the tray 104. When the disc D carried on the tray 104 closest to the back plate 103 of the casing 101 is to be fed to the disc playback unit 7, chucked by the chuck mechanism 33, and played back by the optical reading mechanism 32, since the cavity 110 is defined in the front edge of the back plate 103 and opened by the lid 111, the movable chassis 9 can be moved into alignment with the tray 104 without being obstructed by the back plate 103. Accordingly, the distance between the back plate 103 and the closest tray 104 can be minimized, resulting in a reduction in the overall width of the disc cartridge 100, i.e., the dimension thereof along which the discs D are stacked. Therefore, the size of the disc player is made relatively small.

In this embodiment, the trays 104 with the respective discs D carried thereon are rotatably disposed in a stacked arrangement in the casing 101 of the disc cartridge 100 loaded in the cartridge housing unit 5, and can selectively be angularly moved out of the casing 101. When the disc cartridge 100 is loaded in the cartridge housing unit 5, it is locked in the cartridge housing unit 5 by the lock lever 13 of the locking and ejecting mechanism 6. The movable chassis 9 which supports the disc playback unit 7 and the disc feed mechanism 8 is moved relative to the disc cartridge 100 by the disc moving mechanism 10 in the direction in which the discs D are stacked in the disc cartridge 100.

When the movable chassis 9 is moved to position the disc feed mechanism 8 in alignment with the tray 104 carrying a desired disc D, the disc withdrawing drive gear 72 is rotated to cause the gear 108 meshing with the drive intermediate gear 74 to turn the tray 104 out of the disc cartridge 100 for thereby moving the disc D into alignment with the disc rotating mechanism 31 of the disc playback unit 7. Then, the cam gear 38 is rotated to cause the chuck mechanism 33 to chuck the disc D, after which the disc D is played back by the disc playback unit 7. After the disc D has been played back, the above process is reversed to return the disc D together with the tray 104 back into the casing 101.

To unload the disc cartridge 100 from the cartridge housing unit 5, the unlock lever 16 of the locking and ejecting mechanism 6 is pushed to release the disc cartridge 100 from the lock lever 13. The disc cartridge 100 is then pushed out of the cartridge housing unit 5 by the eject lever 19 under the force of the tension spring 18.

The various mechanisms of the disc player, described above, are housed in the outer housing 1, which typically has the depth D ranging from 215 to 230 mm, the width W ranging from 70 to 95 mm, and the height H ranging from 150 to 160 mm. Consequently, the disc player with the automatic disc changer is relatively small in size and may be positioned in a small space such as in a console box of an automobile or the like without presenting obstacles to efforts to operate on such a console box.

In the case where the disc player according to the present invention is installed in an automobile, it is placed in one space, without being divided into a trunk and a passenger compartment as is customary, and can easily be serviced for the inspection and replacement of the disc cartridge.

As described above, the movable chassis 9 is moved to position the disc feed mechanism 8 in alignment with the tray 104 carrying a desired disc D, and the disc withdrawing drive gear 72 is rotated to cause the gear 108 meshing with the drive intermediate gear 74 to turn the tray 104 out of the disc cartridge 100 for thereby moving the disc D into alignment with the disc rotating mechanism 31 of the disc playback unit 7. When the disc D is moved into alignment with the disc rotating mechanism 31, the holding pulley 75 rotatably supported on the holding arm 77 engages and holds the peripheral edge of the disc D, and the holding arm 77 is turned. On the turning movement of the holding arm 77, it turns on the disc withdrawal detecting switch Sd to confirm that the disc D has been withdrawn from the disc cartridge 100.

When the tray 104 is turned, a side edge of the gear 108 pushes and turns the eject prevention plate 20 into abutment against the engagement pin 13c on the lock lever 13. Therefore, the eject prevention plate 20 prevents the lock lever 13 from being turned in the direction to unlock the casing 101, so that the disc cartridge 100 with one of the trays 104 withdrawn therefrom cannot be ejected out of the cartridge housing unit 5.

When the tray 104 is returned into the casing 101 and detected by the disc withdrawal detecting switch Sd, the eject prevention plate 20 is released from the side edge of the gear 108 and hence displaced away from the lock lever 13. The lock lever 13 is therefore rotatable to allow the disc cartridge 100 to be ejected out of the cartridge housing unit 5.

The drive shaft 91 of hexagonal cross section extends through the movable chassis 9 and is rotatably supported between the side plates 2a, 2b of the mechanical chassis 2. The drive transmission gear 92 supported on the movable chassis 9 is circumferentially and circumferentially fitted over the drive shaft 91 such that it engages along its circumference and is slidable in an axial direction, and the drive gear 87 is fixed to one end of the drive shaft 91 near the side plate 2a. When the drive force from a motor as a drive source is transmitted to either the drive gear 87 or the drive transmission gear 92, it is transmitted to the other gear through the drive shaft 91 irrespective of the position of the movable chassis 9, so that the gears 87, 92 can simultaneously be rotated in unison with each other.

Consequently, a motor as a drive source mounted on either the mechanical chassis 2 or the movable chassis 9 can drive driven mechanisms on the other chassis.

While the discs D are housed vertically, i.e., in vertical planes, in the disc cartridge 100 and are selectively played back while being held in a vertical plane in the disc playback unit 7 in the illustrated embodiment, the discs D may be stacked in horizontal planes in the disc cartridge 100 and played back in horizontal planes in the disc playback unit 7.

With the present invention, as described above, while a disc or a tray is being withdrawn from the disc cartridge, the disc cartridge cannot be ejected from the cartridge housing unit. The disc cartridge can be ejected only after a withdrawn disc or tray has been stored in the disc cartridge. Therefore, the withdrawn disc or tray and the disc playback unit are protected from damage, and can be used safely.

The mechanical chassis which houses the disc playback unit is fixedly supported in the outer housing when the disc cartridge is loaded into and unloaded from the cartridge housing unit, and is released in response to the operation to chuck a disc in the disc playback unit and floatingly supported in the outer housing during the playback of the disc. Accordingly, the disc can be played back stably and reliably without being adversely affected by vibrations applied to the outer housing. This is particularly advantageous when the disc player is mounted on an automobile.

Since the drive source may be mounted on either the mechanical chassis which houses discs or the movable chassis which supports the disc playback unit and used as a drive source for the other chassis, the disc player may be simplified in structure and reduced in weight.

Any disc stored in the disc cartridge can be played back without having to be withdrawn in its entirety from the disc cartridge. Thus, the disc player is reduced in dimensions in the direction in which discs are withdrawn from the disc cartridge. As a result, the disc player may be relatively small in overall size.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A disc player comprising:

an outer housing;

a cartridge housing unit disposed in a front section of said outer housing;

a disc cartridge, removably loaded in said cartridge housing unit, for housing a stack of trays which carry disks respectively thereon, said trays being selectively withdrawable from said disc cartridge;

withdrawing means arranged in said outer housing for partly withdrawing from said disc cartridge a selected one of the trays which carries a corresponding disc thereon;

disc playback means arranged in said outer housing for playing back a disc carried on said tray which has been partly withdrawn from said disc cartridge by said withdrawing means;

detecting means arranged in said outer housing for detecting whether a tray or a disc carried thereon is partly withdrawn from said disc cartridge; and locking and ejecting means arranged in said outer housing for selectively locking said disc cartridge in said cartridge housing unit and ejecting said disc cartridge from said cartridge housing unit;

said locking and ejecting means comprising means for allowing said disc cartridge to be ejected from said cartridge housing unit only after said partly withdrawn tray with said disc carried thereon is returned into said disc cartridge by said withdrawing means when said tray or said disc has been detected as being partly withdrawn from said disc cartridge by said detecting means;

wherein said outer housing includes an insertion slot for insertion therethrough of said disc cartridge into said cartridge housing unit, and further comprising:

a chassis disposed in said outer housing in a spaced-apart relationship to inner surfaces of said outer housing, said disc playback means being mounted on said chassis; and holding means arranged between said chassis and said inner surfaces of said outer housing for holding said chassis floatingly within said outer housing during said playing back of said disc and fixedly with respect to said outer housing to keep said chassis spaced from said inner surfaces of said outer housing when said disc cartridge is loaded into and unloaded out of said cartridge housing unit through said insertion slot, wherein said holding means comprises:

a plurality of lock hooks rotatably mounted on said chassis at a front, a rear, an upper and a lower side thereof; and an interlink mechanism slidingly mounted on said chassis extending from the front side to the rear side and from the upper side to the lower side of said chassis for lateral and transverse movement and connected to each of said plurality of lock hooks to interlink said plurality of lock hooks for simultaneous rotation toward and from engagement with said inner surfaces of said outer housing.

2. A disc player according to claim 1, further comprising:

chuck means disposed in said outer housing for chucking said partly withdrawn disc in said disc playback means; and drive force transmitting means disposed in said outer housing for transmitting a drive force to said chuck means, said drive force transmitting means including means for actuating said holding means to hold said chassis fixedly with respect to said outer housing to keep said chassis spaced from said inner surfaces of said outer housing when said disc cartridge is loaded into and unloaded out of said cartridge housing unit through said insertion slot.

3. A disc player according to claim 1, wherein said plurality of lock hooks comprises a first set of lock hooks and a second set of lock hooks, and wherein said interlink mechanism comprises a first interlink mechanism and a second interlink mechanism such that said first interlink mechanism interlinks said first set of lock hooks and said second interlink mechanism interlinks said second set of lock hooks, said first set of lock hooks being disposed on a first side of said chassis and said second set of lock hooks being disposed on a second side of said chassis opposite and parallel to said first side, and further comprising connecting means for connecting said first set of lock hooks to said second set of lock hooks.

4. A disc player as claimed in claim 3, wherein said connecting means comprises a plurality of connecting rods for connecting said first set of lock hooks to said second set of lock hooks.

5. A disc cartridge and a disc player therefor, said disc cartridge comprising:

a casing housing a stack of discs in spaced-apart relationship to each other;

said casing having a front opening for allowing one disc of said stack of discs to be partly withdrawn from said casing and returned into said casing therethrough;

said casing having a cavity defined therein and extending from said front opening to a side plate thereof confronting said stack of discs;

a lid movably mounted on said casing for selectively opening and closing said cavity; and means for respectively partly withdrawing and returning a selected disc of said stack of discs from and into said casing through said front opening; and said disc player comprising:

an outer housing;

a cartridge housing unit disposed in a front section of said outer housing;

said disc cartridge is removably loaded in said cartridge housing unit and houses a stack of trays which carry disks respectively thereon, said trays being selectively withdrawable from said disc cartridge;

withdrawing means arranged in said outer housing for partly withdrawing from said disc cartridge a selected one of the trays which carries a corresponding disc thereon;

disc playback means arranged in said outer housing for playing back a disc carried on said tray which has been partly withdrawn from said disc cartridge by said withdrawing means;

detecting means arranged in said outer housing for detecting whether a tray or a disc carried thereon is partly withdrawn from said disc cartridge; and locking and ejecting means arranged in said outer housing for selectively locking said disc cartridge in said cartridge housing unit and ejecting said disc cartridge from said cartridge housing unit;

said locking and ejecting means comprising means for allowing said disc cartridge to be ejected from said cartridge housing unit only after said partly withdrawn tray with said disc carried thereon is returned into said disc cartridge by said withdrawing means when said tray or said disc has been detected as being partly withdrawn from said disc cartridge by said detecting means;

wherein said outer housing includes an insertion slot for insertion therethrough of said disc cartridge into said cartridge housing unit, and further comprising:

a chassis disposed in said outer housing in a spaced-apart relationship to inner surfaces of said outer housing, said disc playback means being mounted on said chassis; and holding means arranged between said chassis and said inner surfaces of said outer housing for holding said chassis floatingly within said outer housing during said playing back of said disc and fixedly with respect to said outer housing to keep said chassis spaced from said inner surfaces of said outer housing when said disc cartridge is loaded into and unloaded out of said cartridge housing unit through said insertion slot, wherein said holding means comprises:

a plurality of lock hooks rotatably mounted on said chassis at a front, a rear, an upper and a lower side thereof; and an interlink mechanism slidingly mounted on said chassis extending from the front side to the rear side and from the upper side to the lower side of said chassis for lateral and transverse movement and connected to each of said plurality of lock hooks to interlink said plurality of lock hooks for simultaneous rotation toward and from engagement with said inner surfaces of said outer housing.

6. A disc cartridge and disc player therefor according to claim 5, further comprising urging means for urging said lid in a direction to close said cavity.

7. A disc player according to claim 5, wherein said plurality of lock hooks comprises a first set of lock hooks and a second set of lock hooks, and wherein said interlink mechanism comprises a first interlink mechanism and a second interlink mechanism such that said first interlink mechanism interlinks said first set of lock hooks and said second interlink mechanism interlinks said second set of lock hooks, said first set of lock hooks being disposed on a first side of said chassis and said second set of lock hooks being disposed on a second side of said chassis opposite and parallel to said first side, and further comprising connecting means for connecting said first set of-lock hooks to said second set of lock hooks.

8. A disc player as claimed in claim 7, wherein said connecting means comprises a plurality of connecting rods for connecting said first set of lock hooks to said second set of lock hooks.

* * * * *

UNITED STATES PATENT AND TRADEMARK OFFICE
CERTIFICATE OF CORRECTION

PATENT NO.   : 5,586,103
DATED        : December 17, 1996
INVENTOR(S)  : Ryoji Takamatsu, et. al.

It is certified that error appears in the above-indentified patent and that said Letters Patent is hereby corrected as shown below:

Title page, item [54] and col. 1, line 2,
In the Title, change "CHARGER" to --CHANGER--
Col.9, line 2, change "toward move to the" to --to move toward the--
Col.15, line 3, delete "circumferentially and circumferentially"

Col.18, line 49, change "of-lock" to --of lock--

Signed and Sealed this

Twenty-eighth Day of July, 1998

Attest:

BRUCE LEHMAN

Attesting Officer        Commissioner of Patents and Trademarks